Feb. 21, 1939.                E. V. SWANGREN                2,148,247
                        MACHINE FOR FORMING CAN ENDS
                     Filed Oct. 18, 1935        24 Sheets-Sheet 1
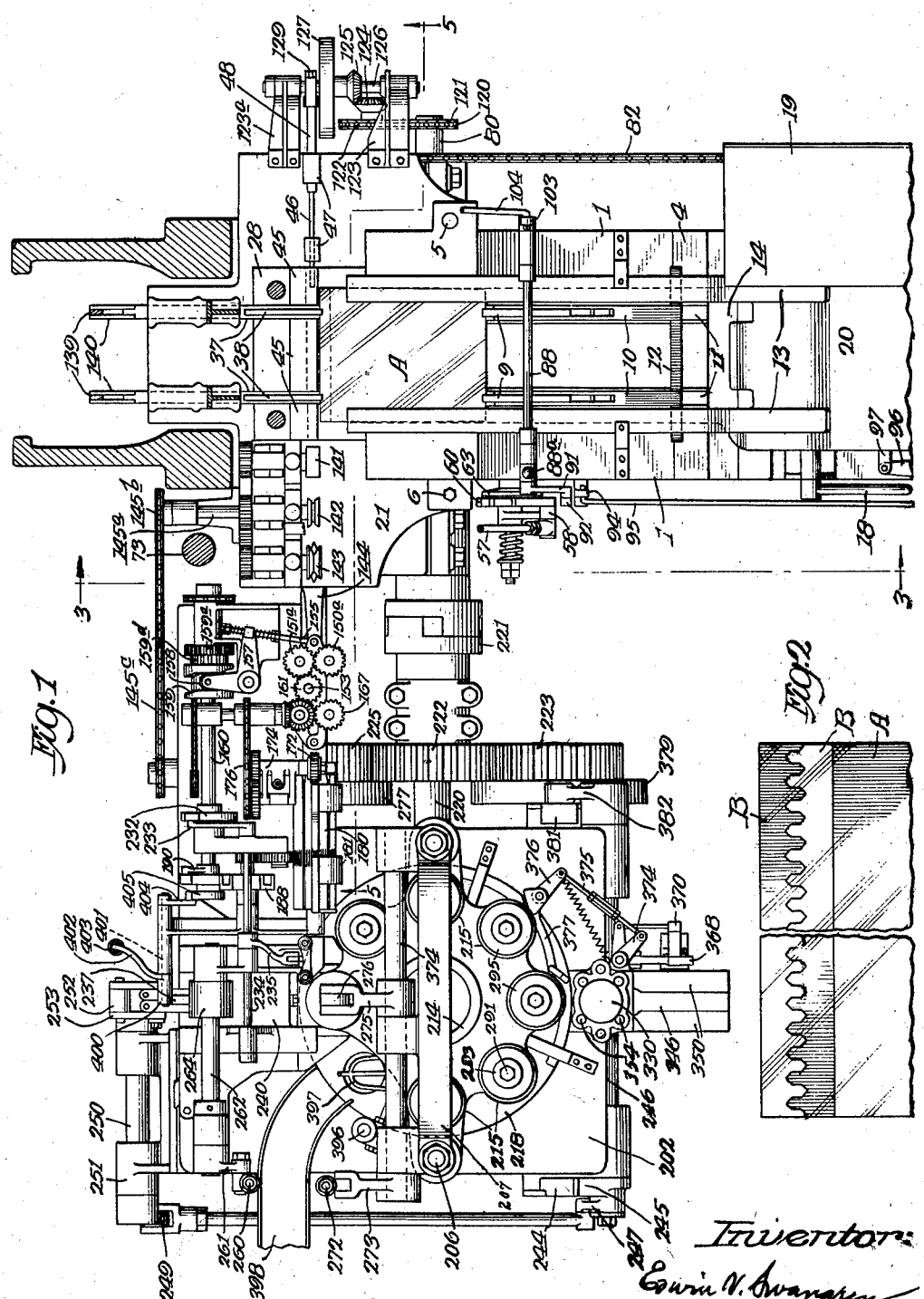

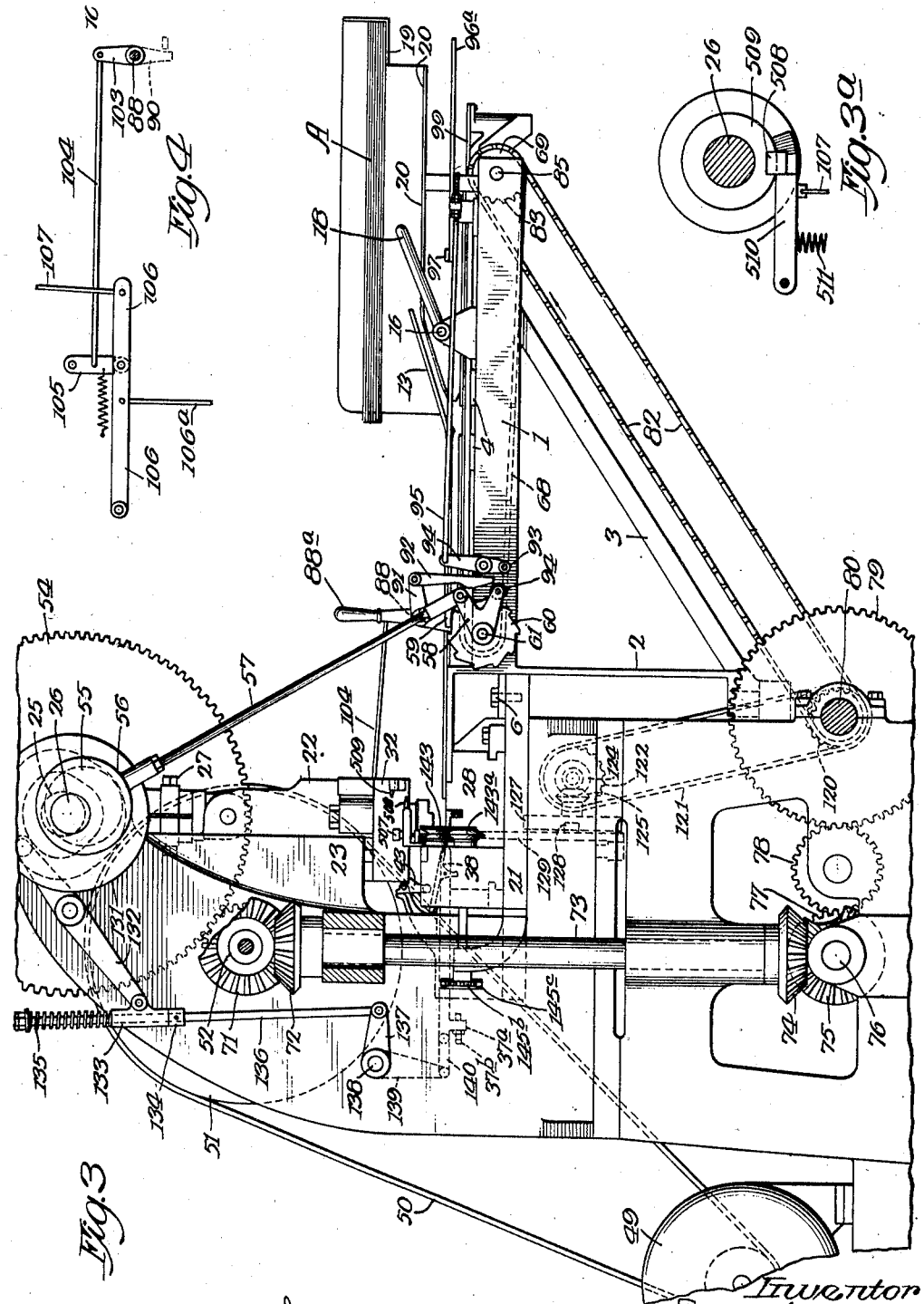

Feb. 21, 1939.　　　E. V. SWANGREN　　　2,148,247
MACHINE FOR FORMING CAN ENDS
Filed Oct. 18, 1935　　　24 Sheets-Sheet 3
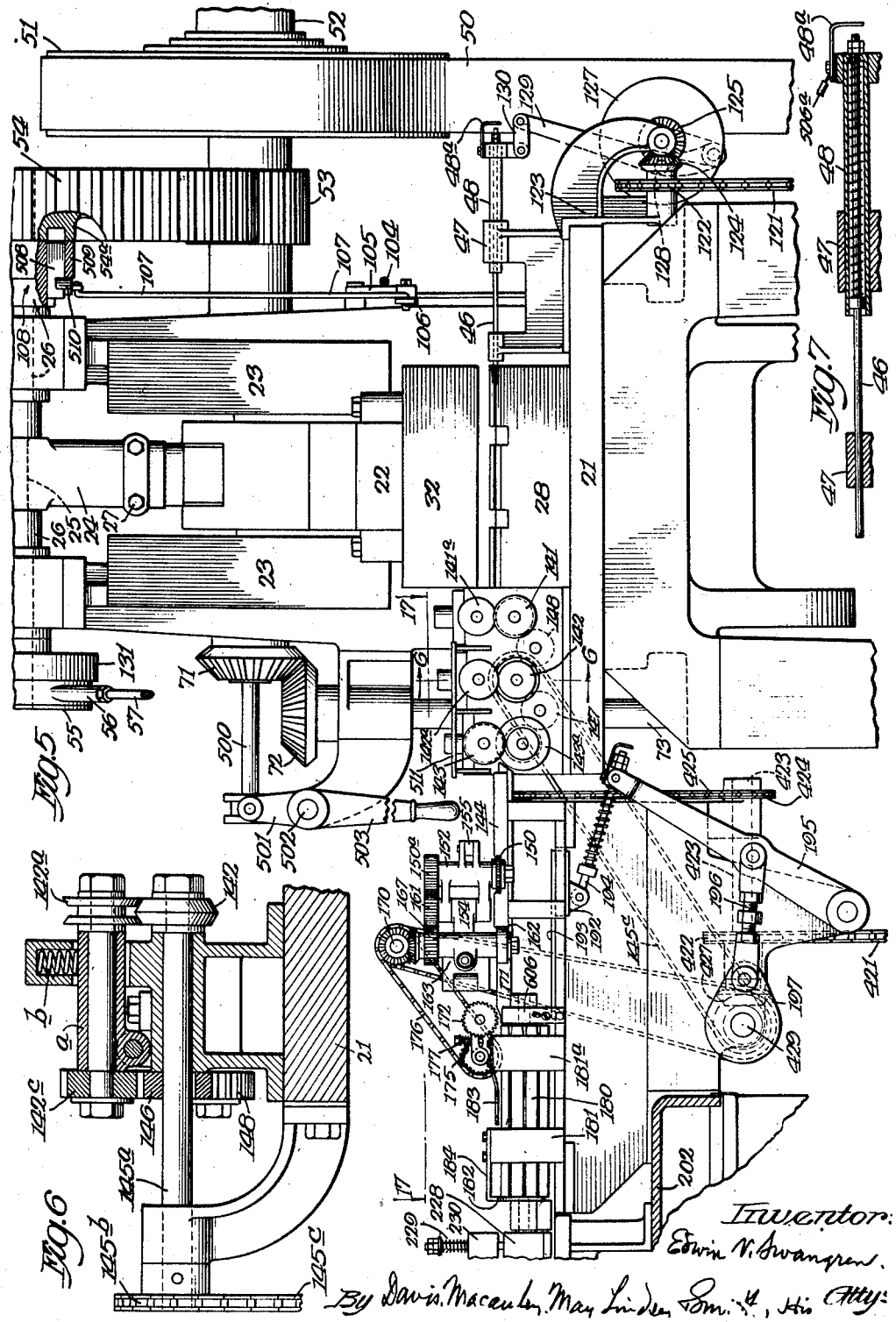
Inventor:
Edwin V. Swangren.
By Davis, Macauley, May, Lindsey Smith, His Atty.

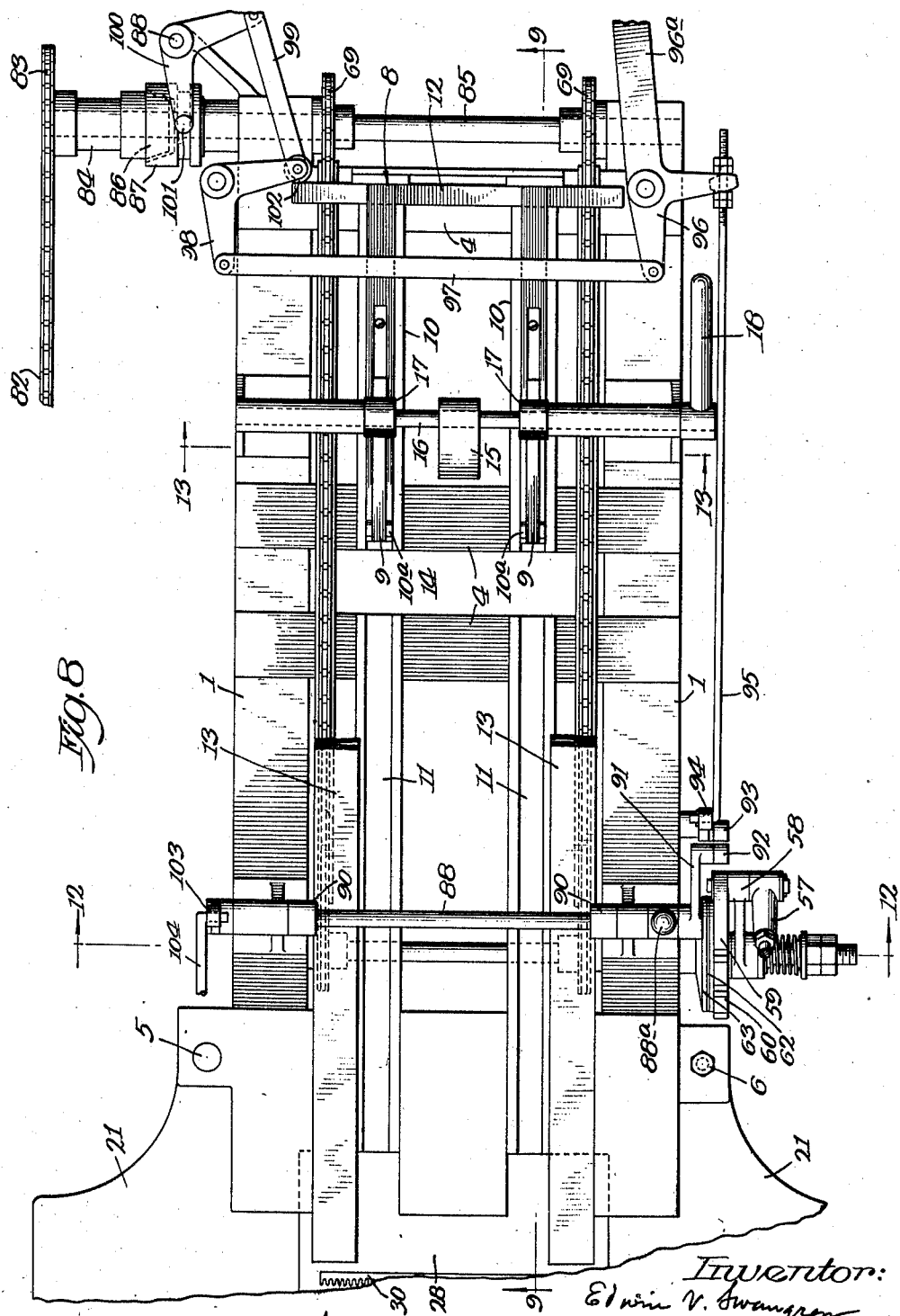

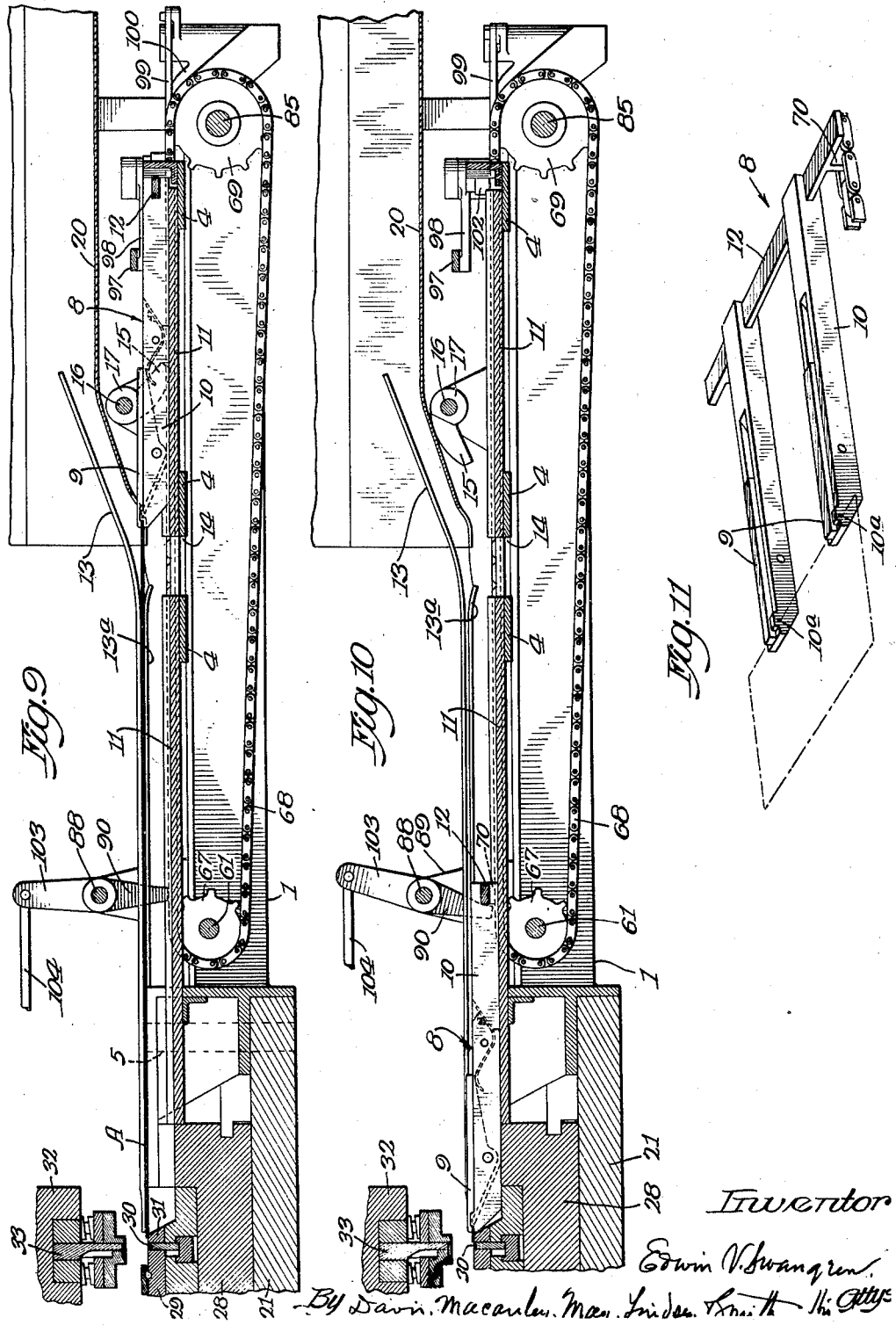

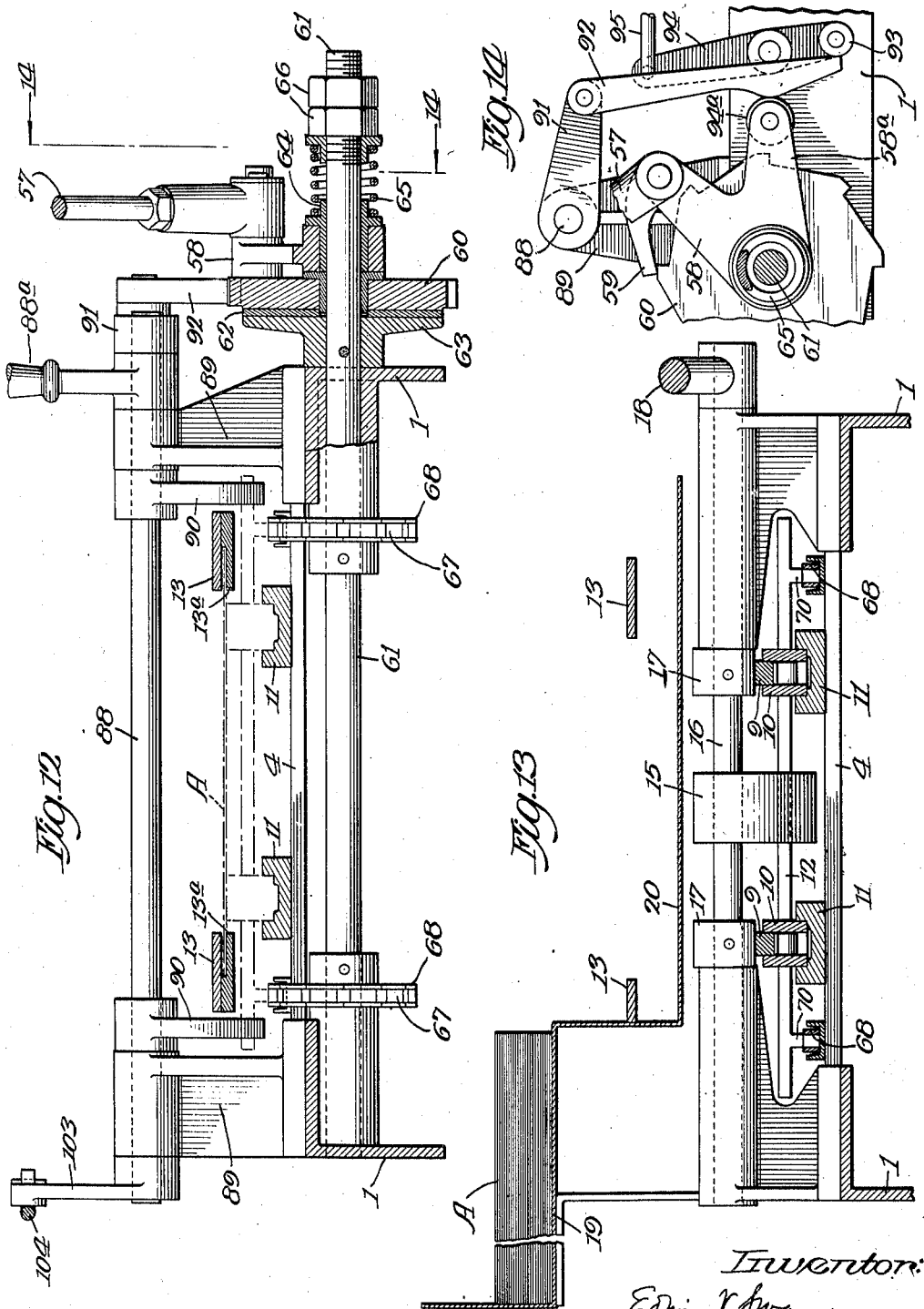

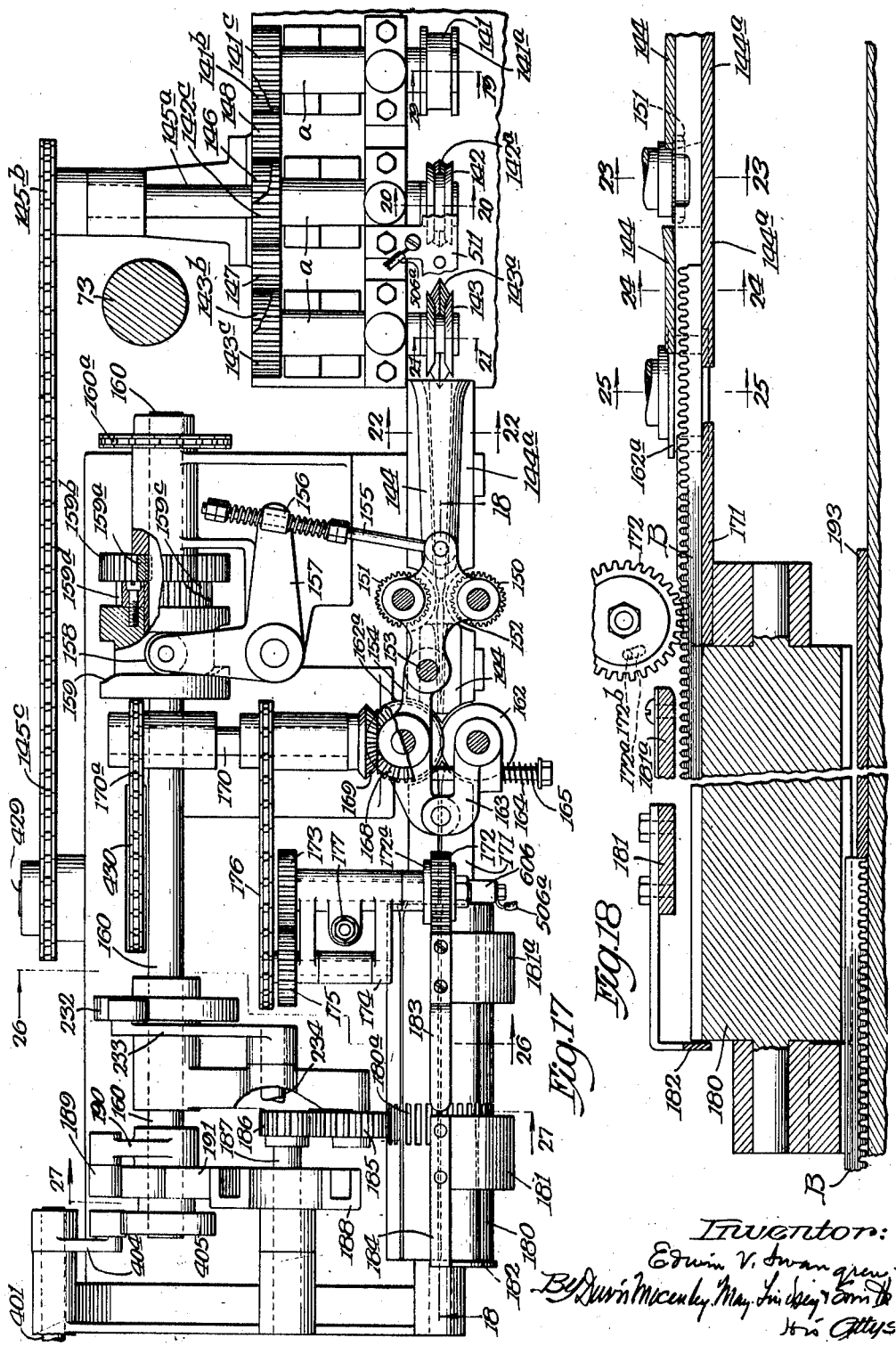

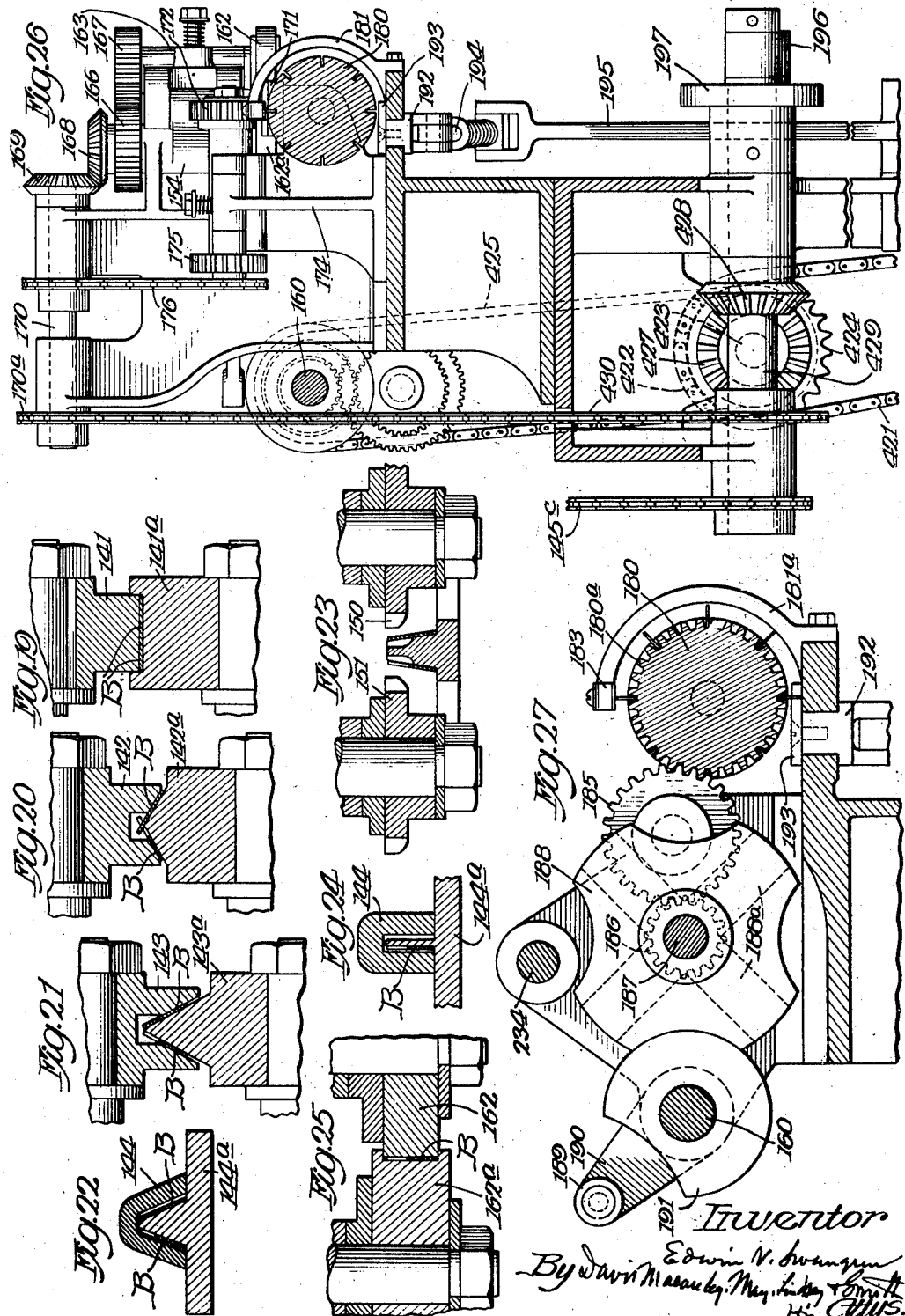

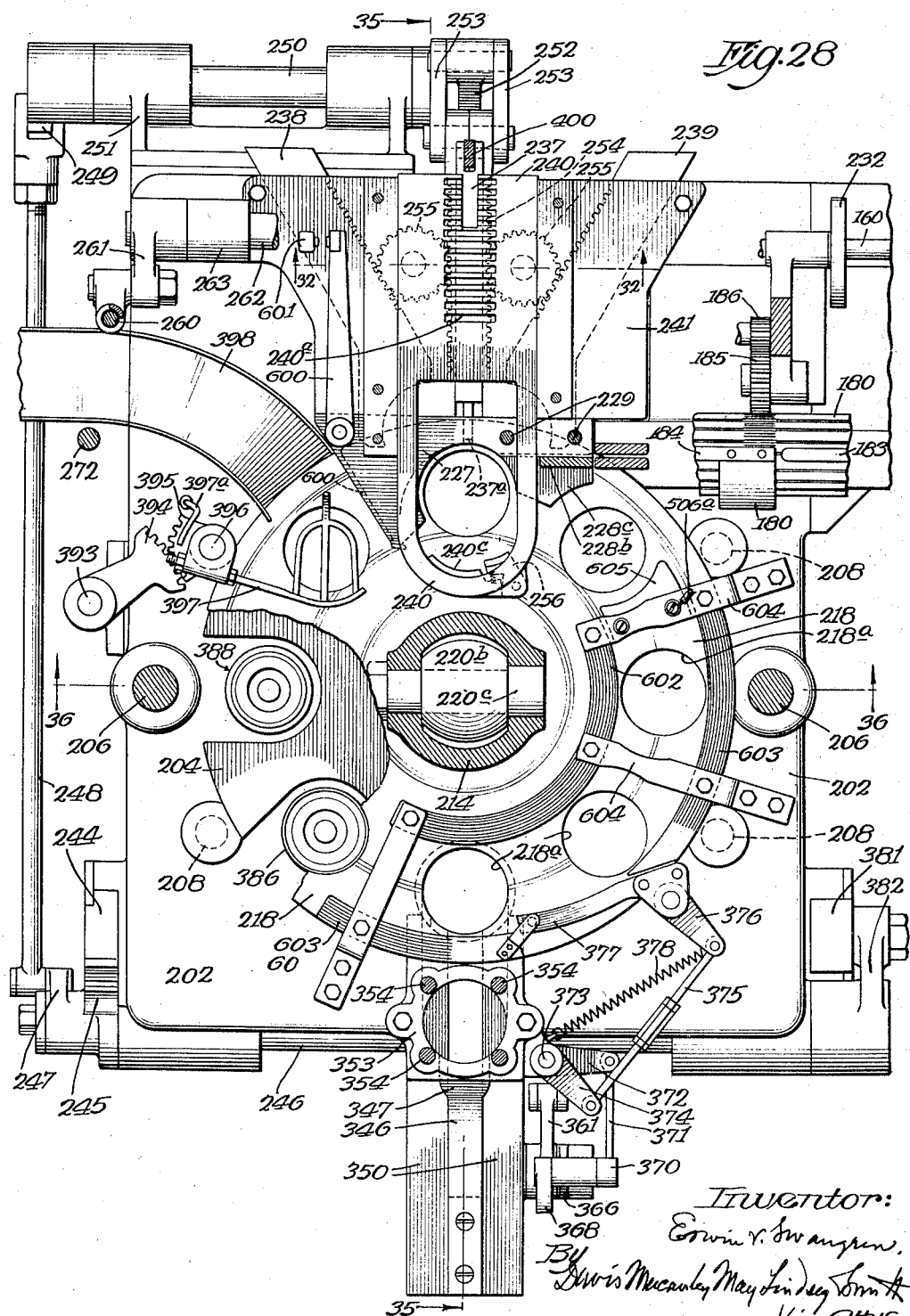

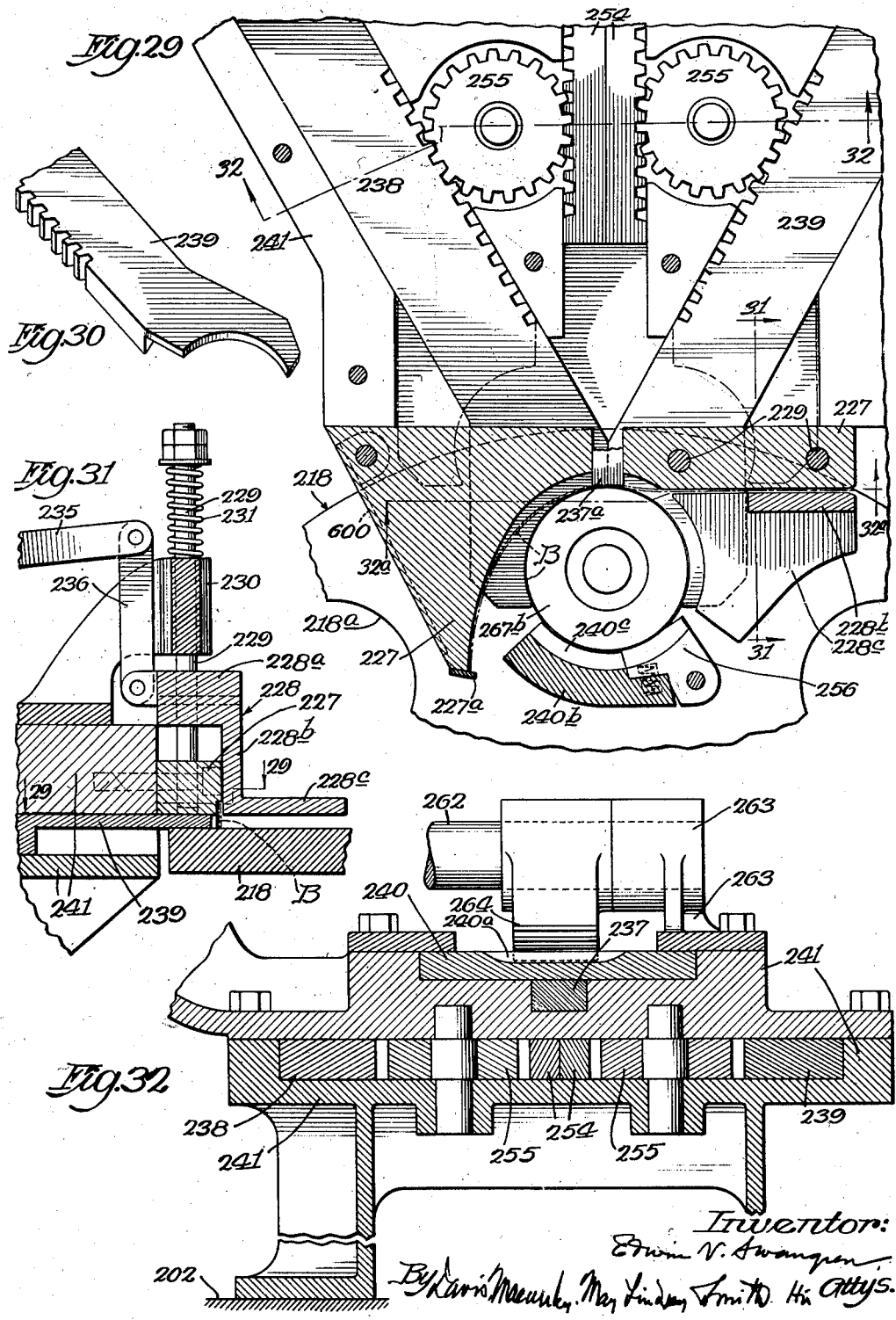

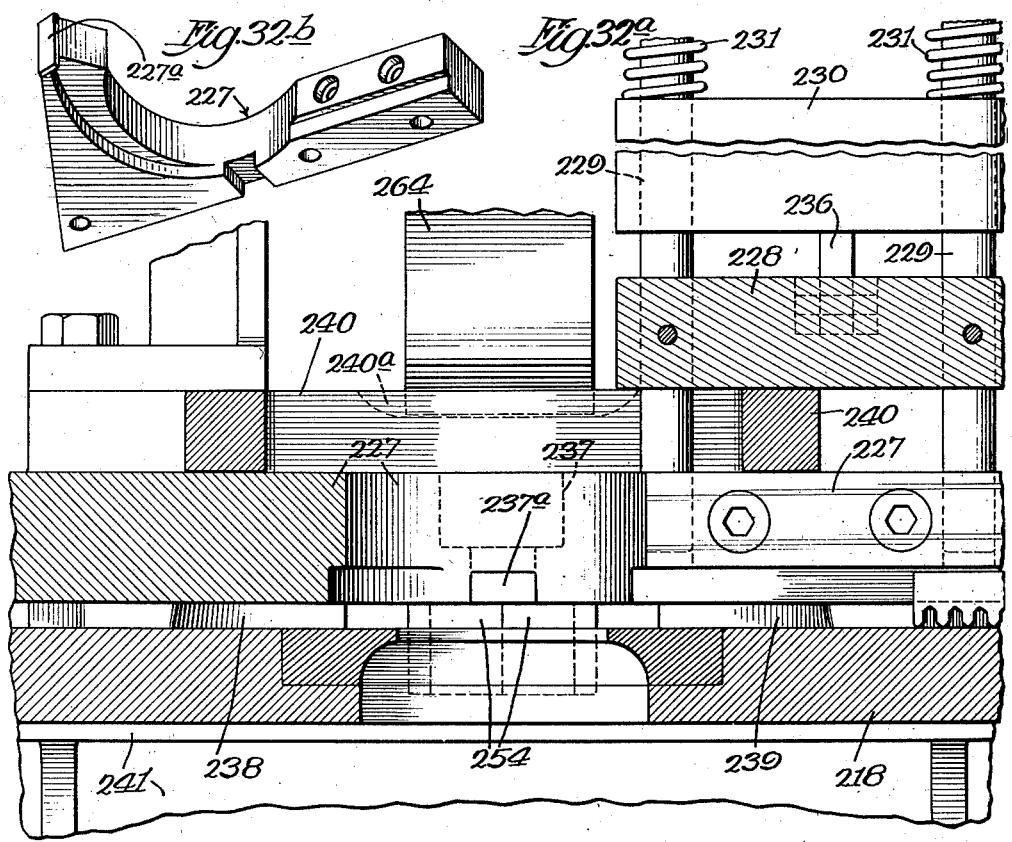
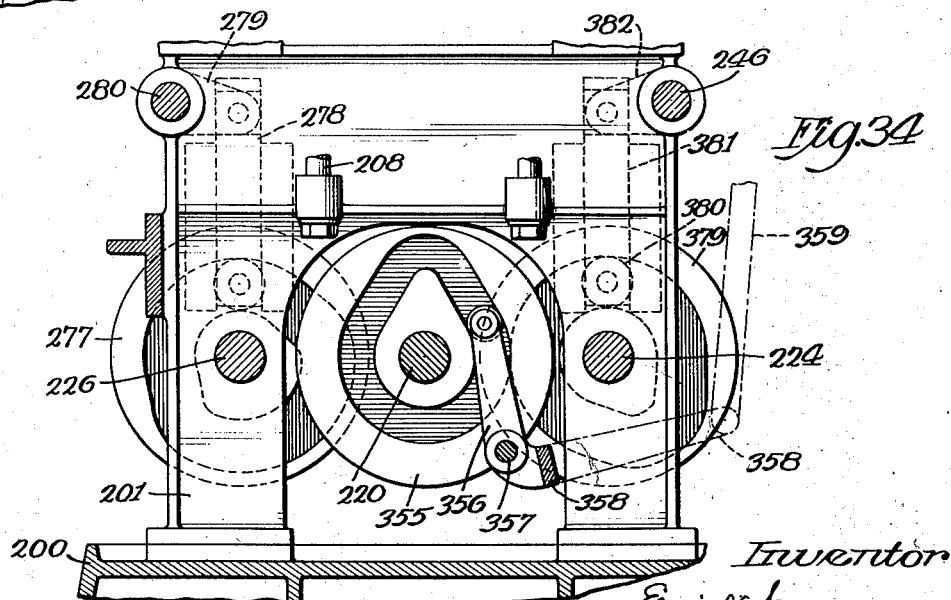

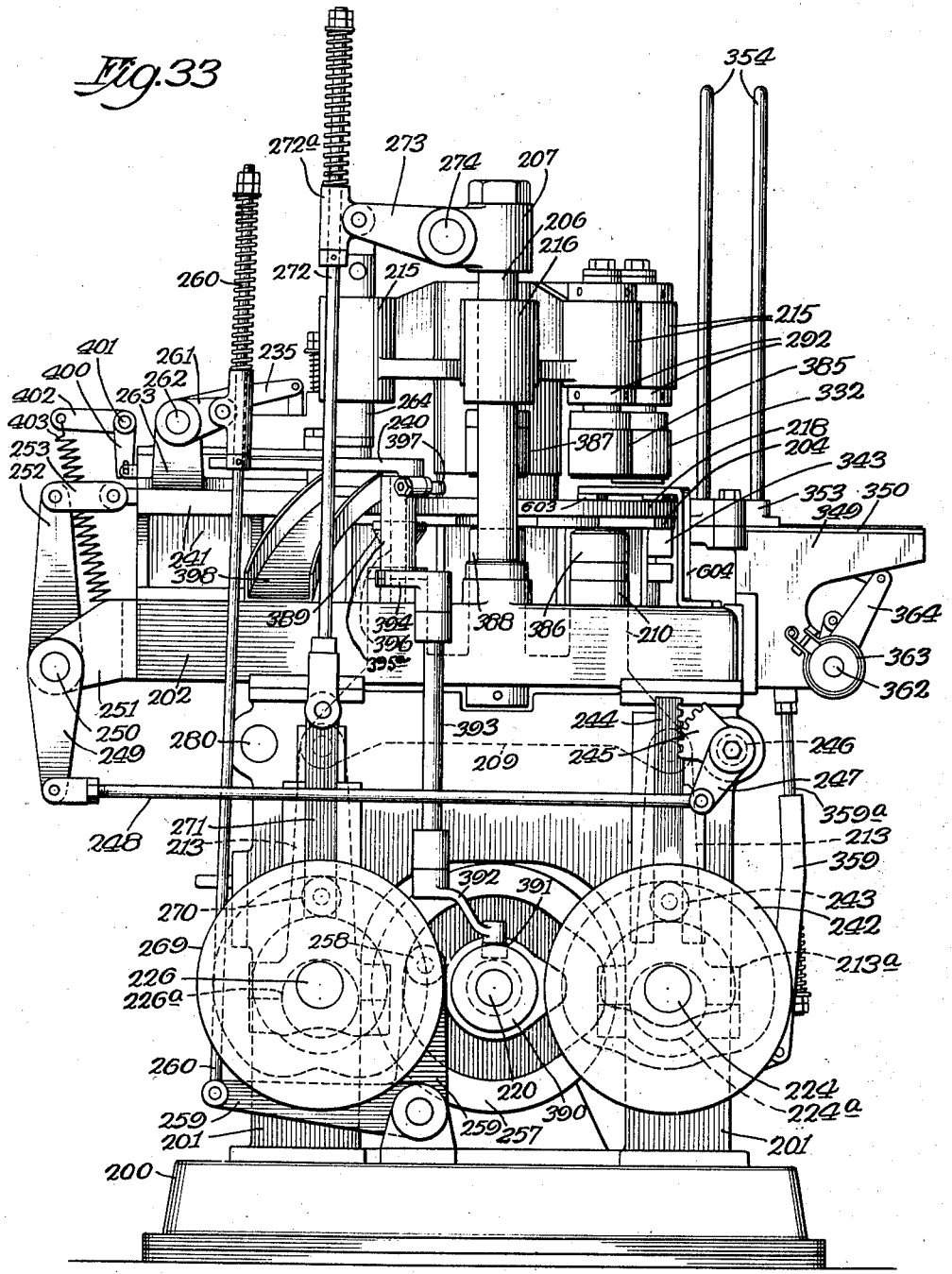

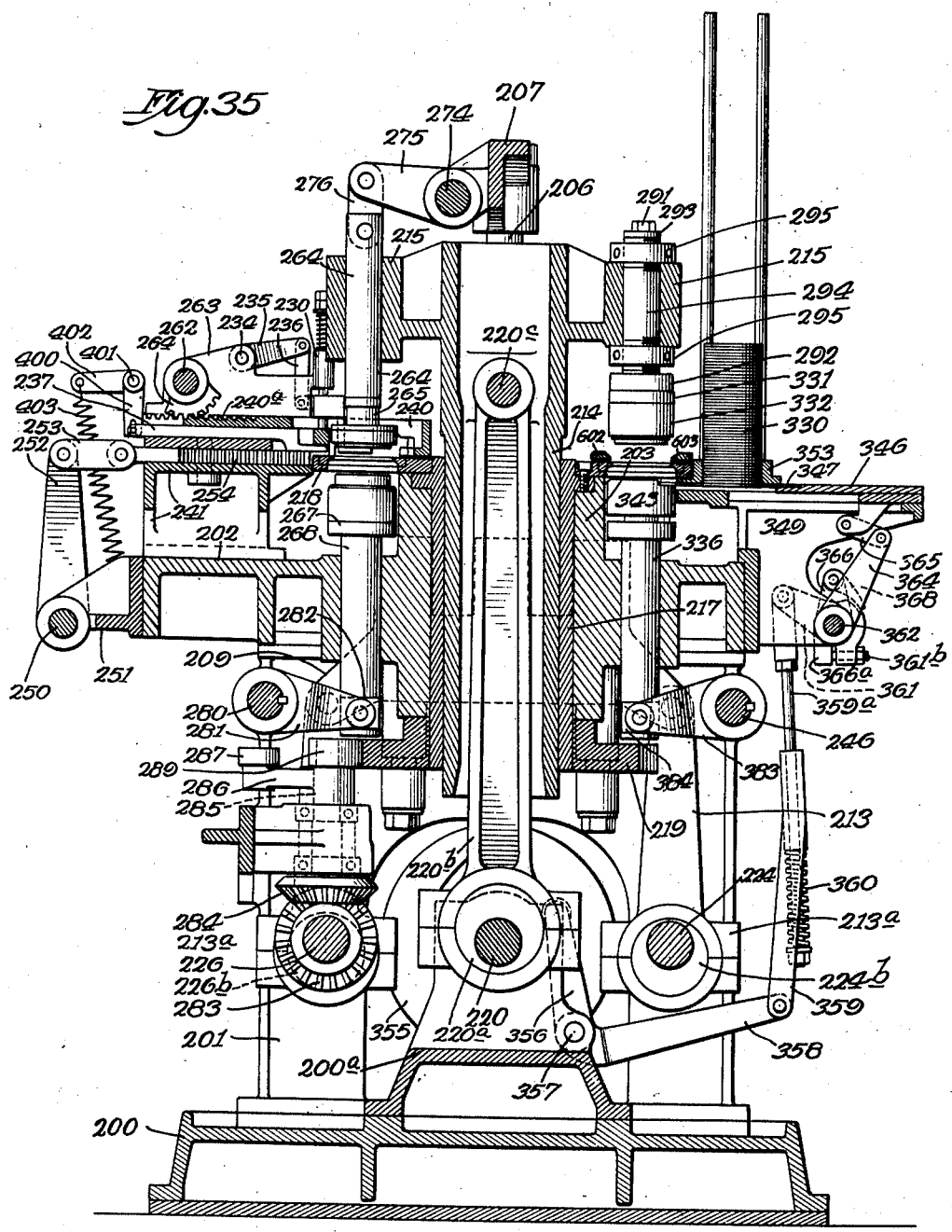

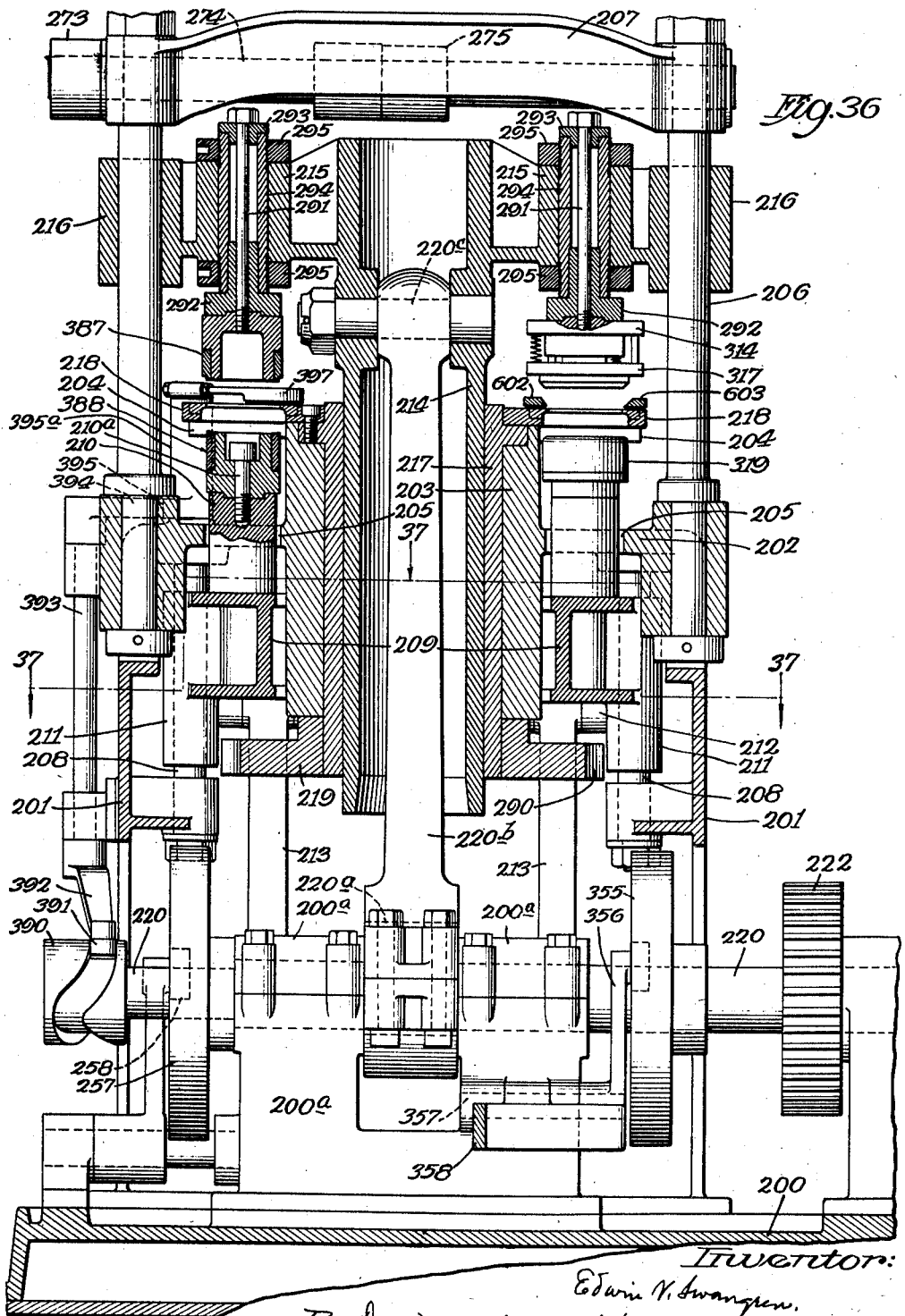

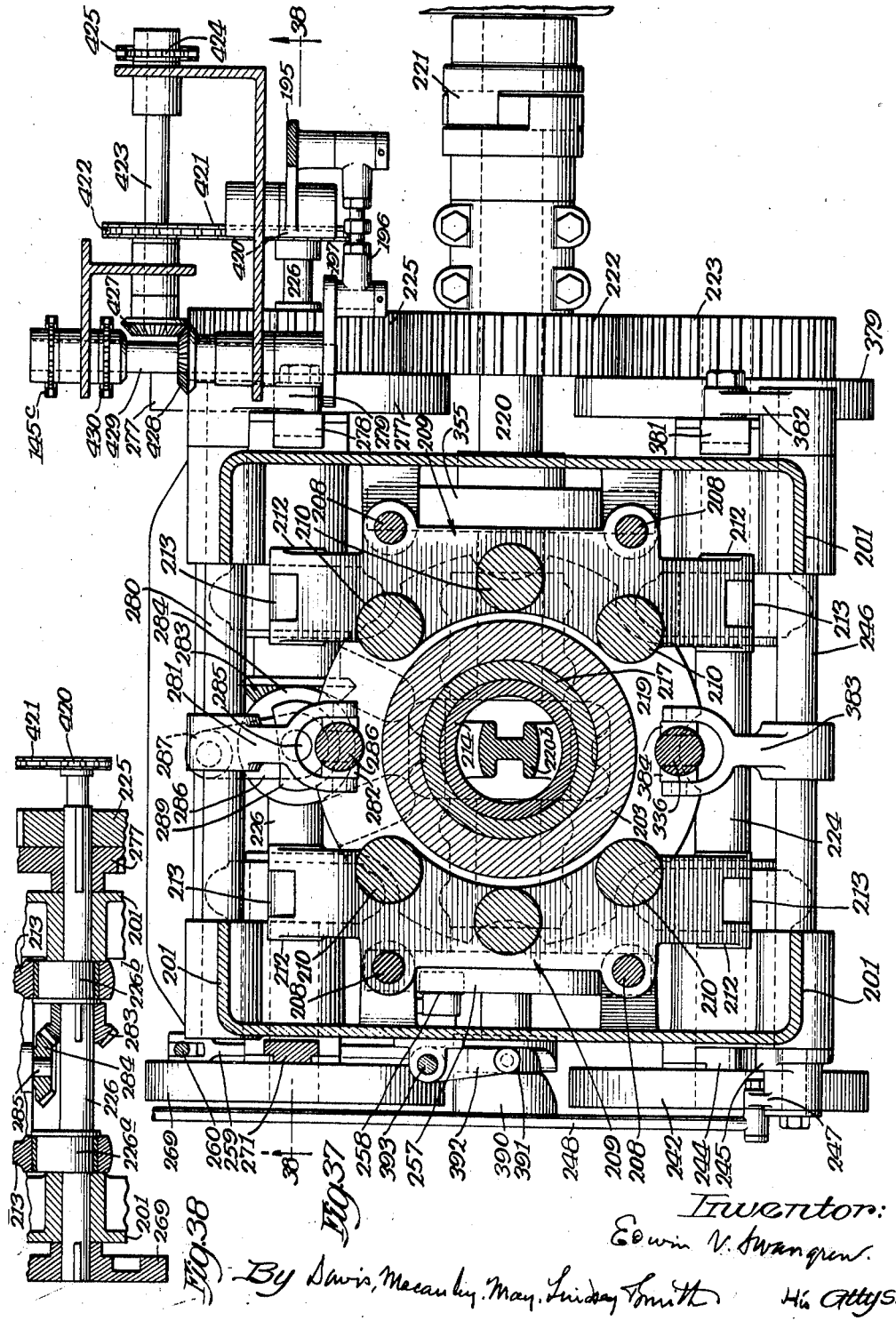

Feb. 21, 1939. E. V. SWANGREN 2,148,247
MACHINE FOR FORMING CAN ENDS
Filed Oct. 18, 1935 24 Sheets-Sheet 17
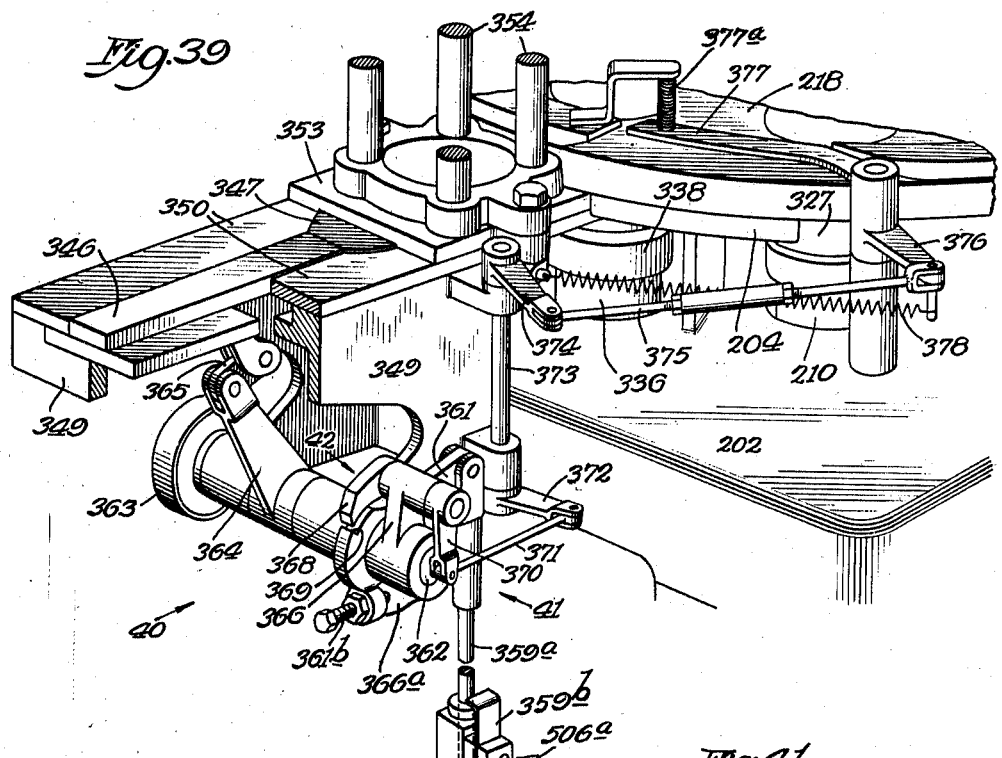
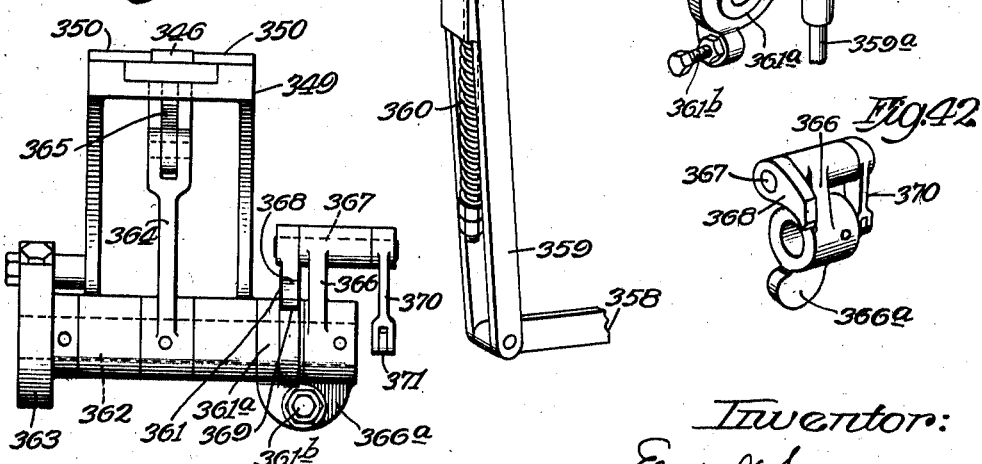
Inventor:
Edwin V. Swangren

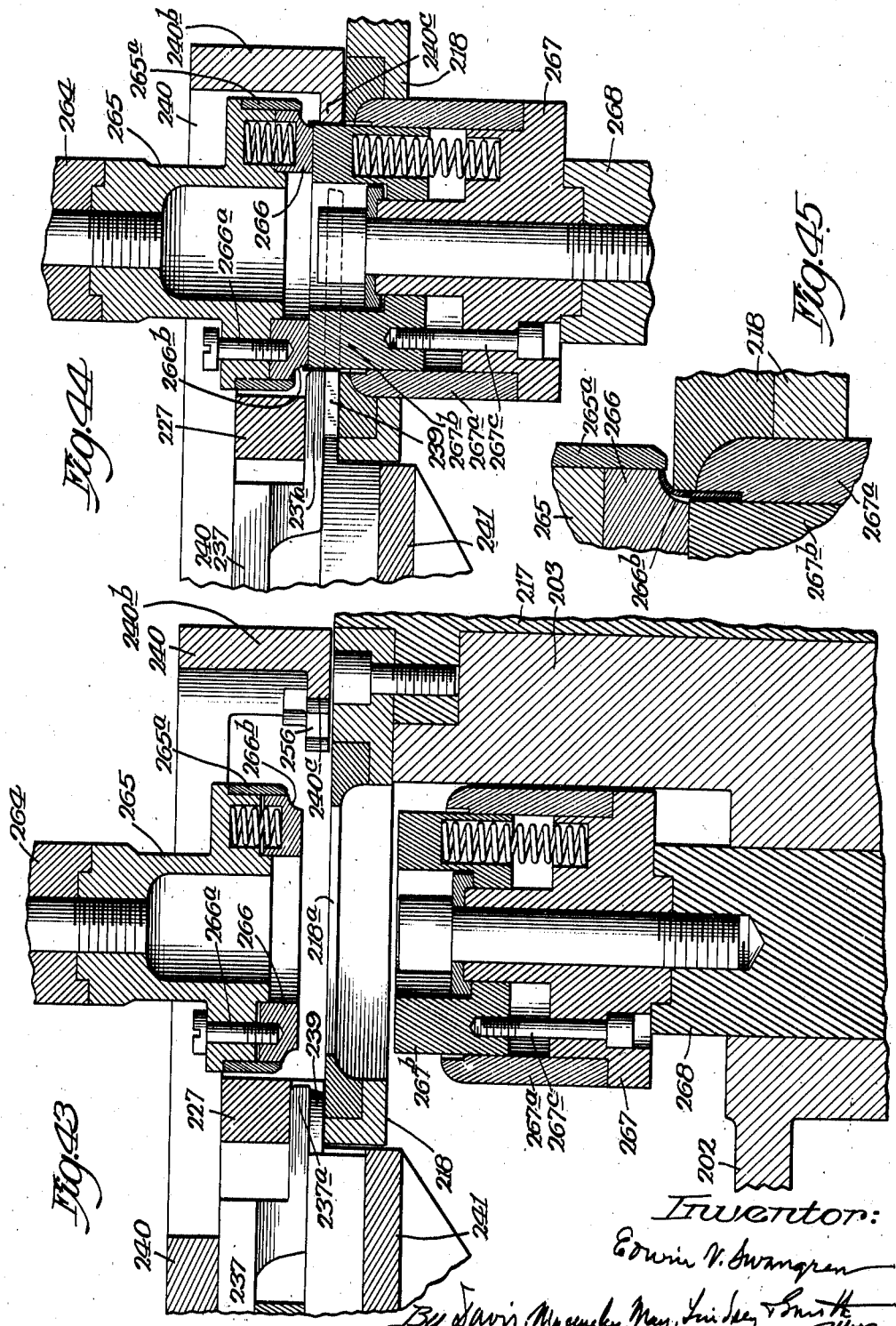

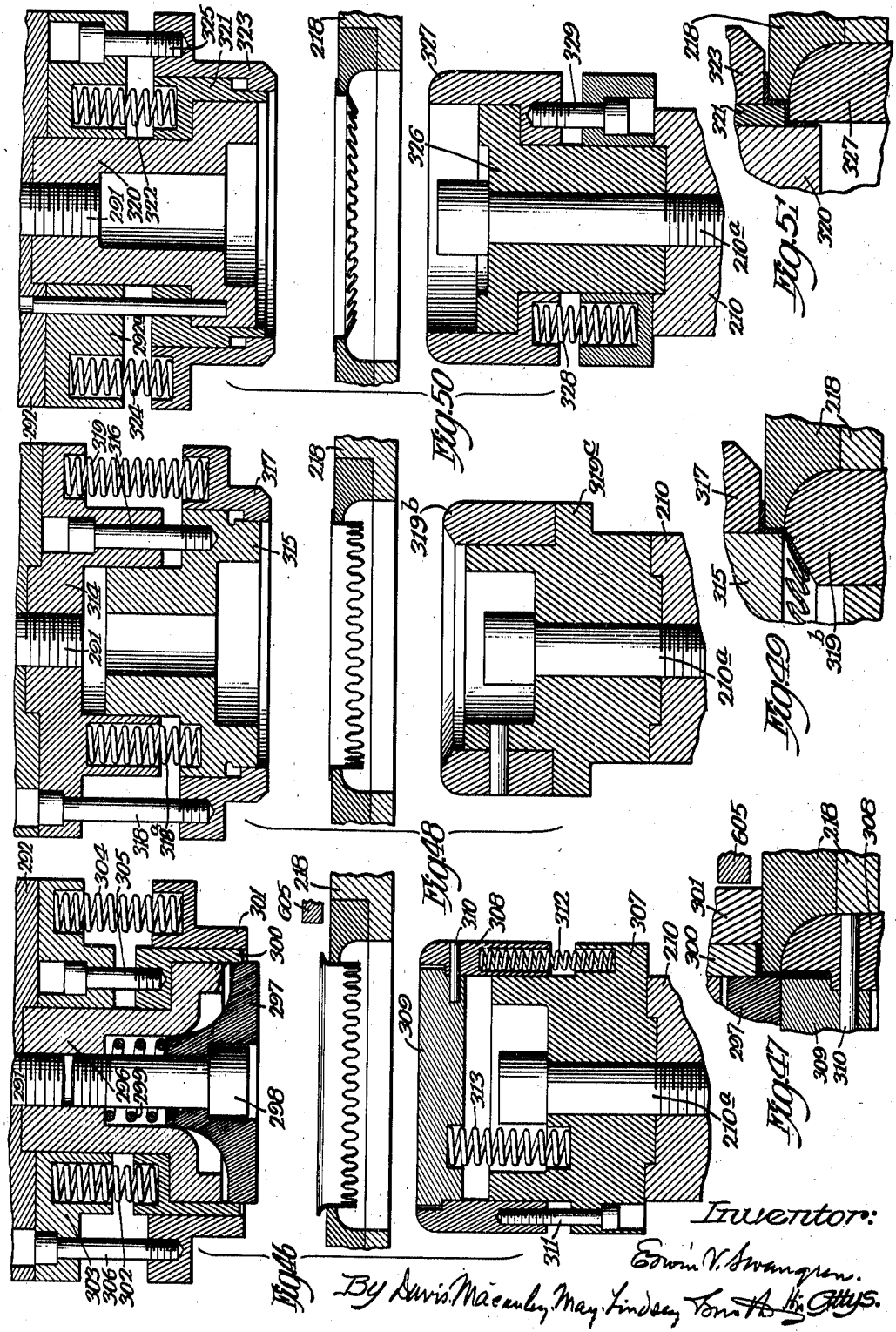

Feb. 21, 1939.  E. V. SWANGREN  2,148,247
MACHINE FOR FORMING CAN ENDS
Filed Oct. 18, 1935   24 Sheets-Sheet 20
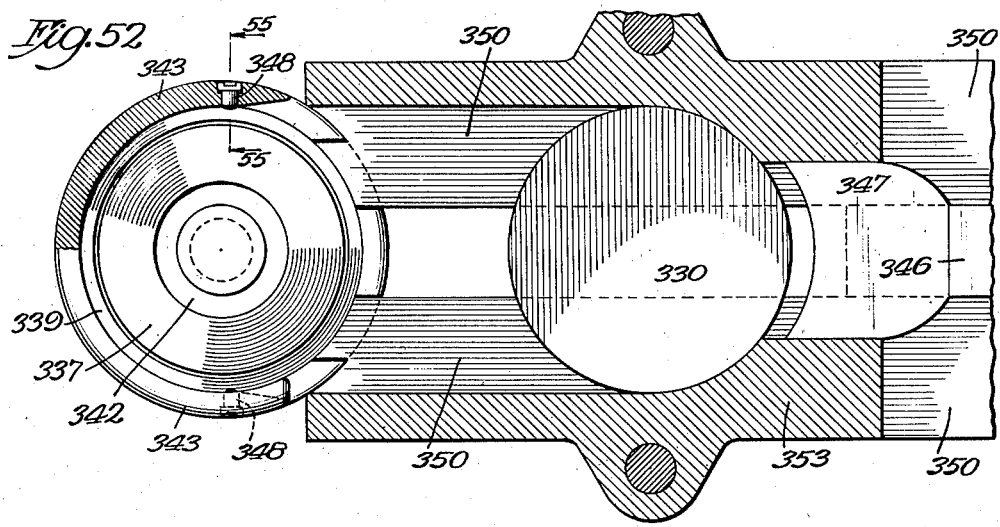
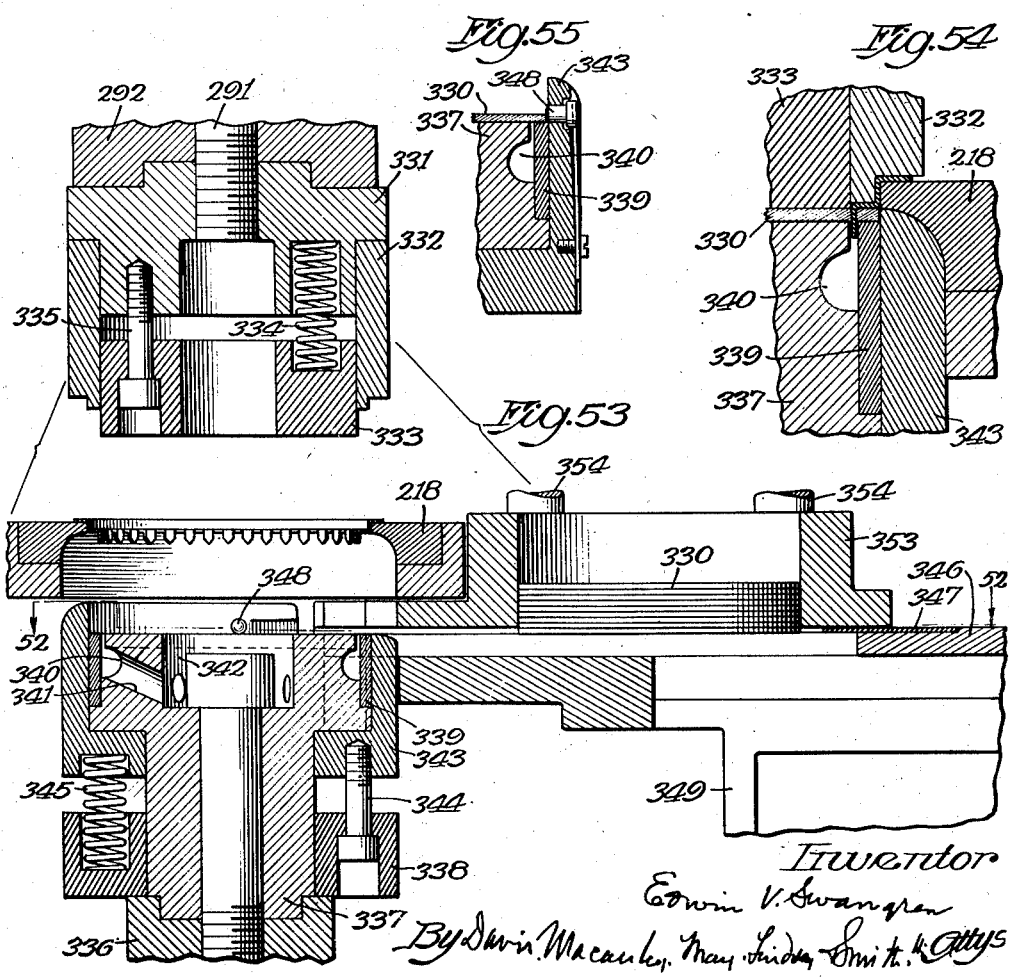
Inventor
Edwin V. Swangren
By Davis, Macauley, May, Lindsey, Smith Attys

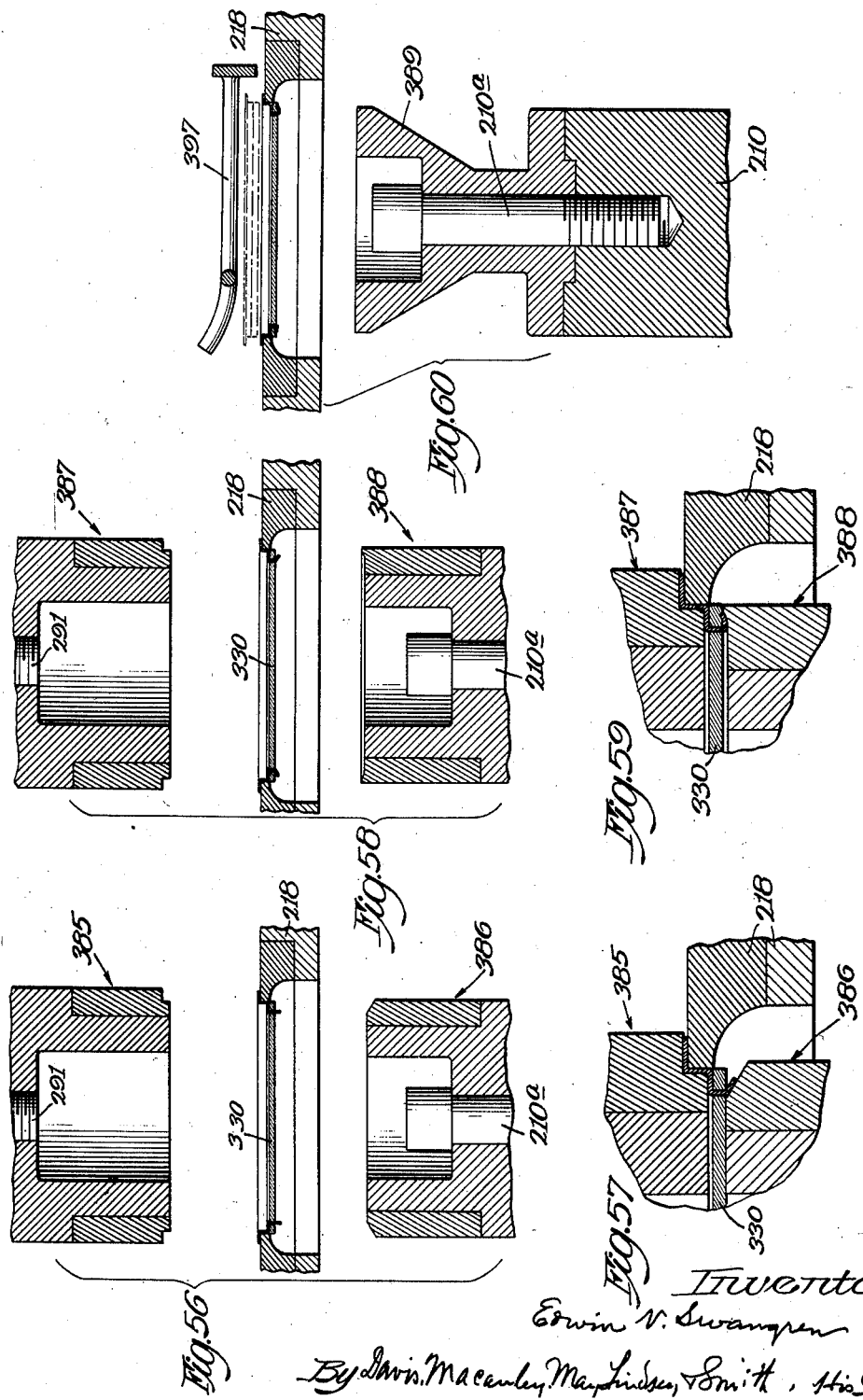

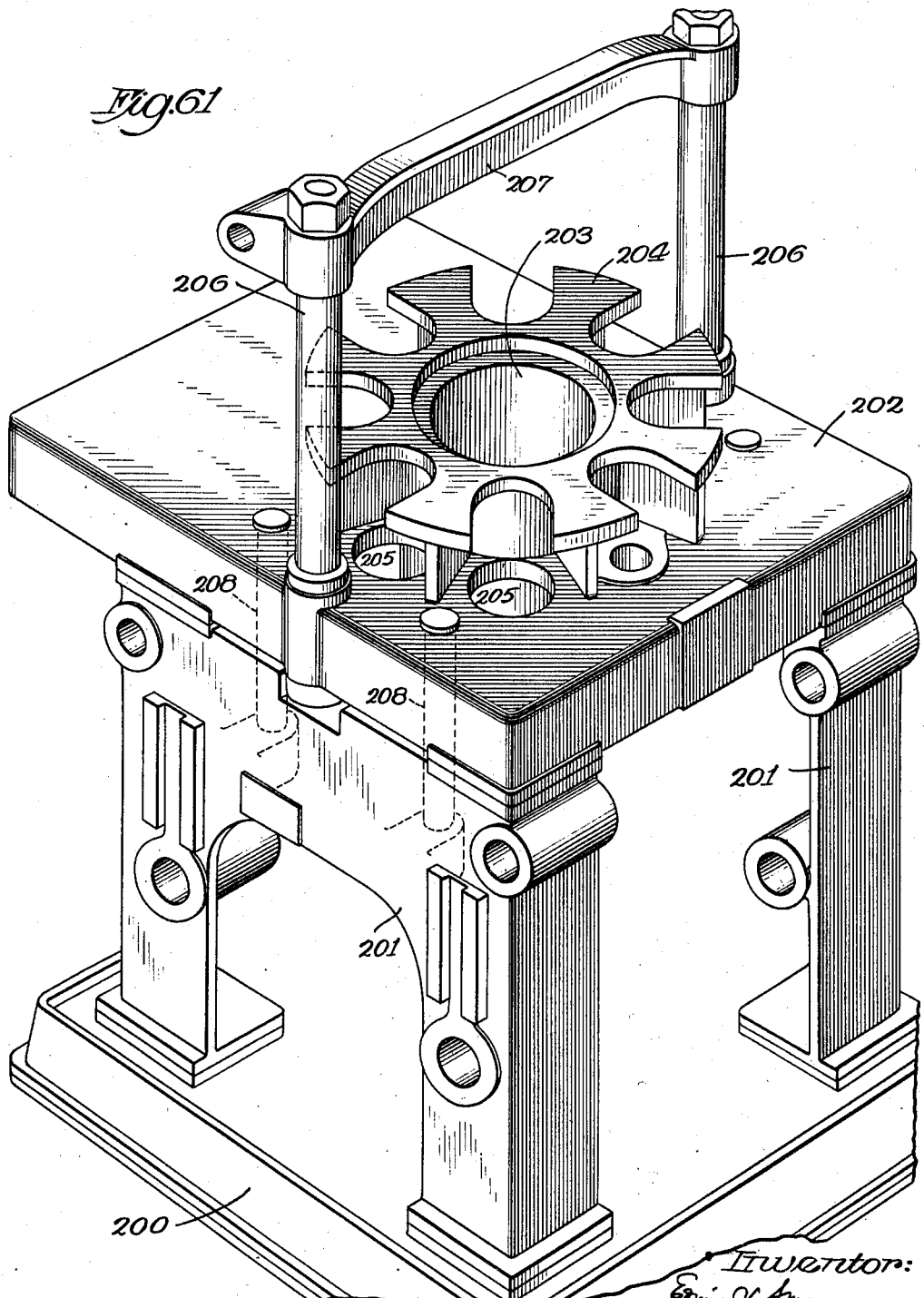

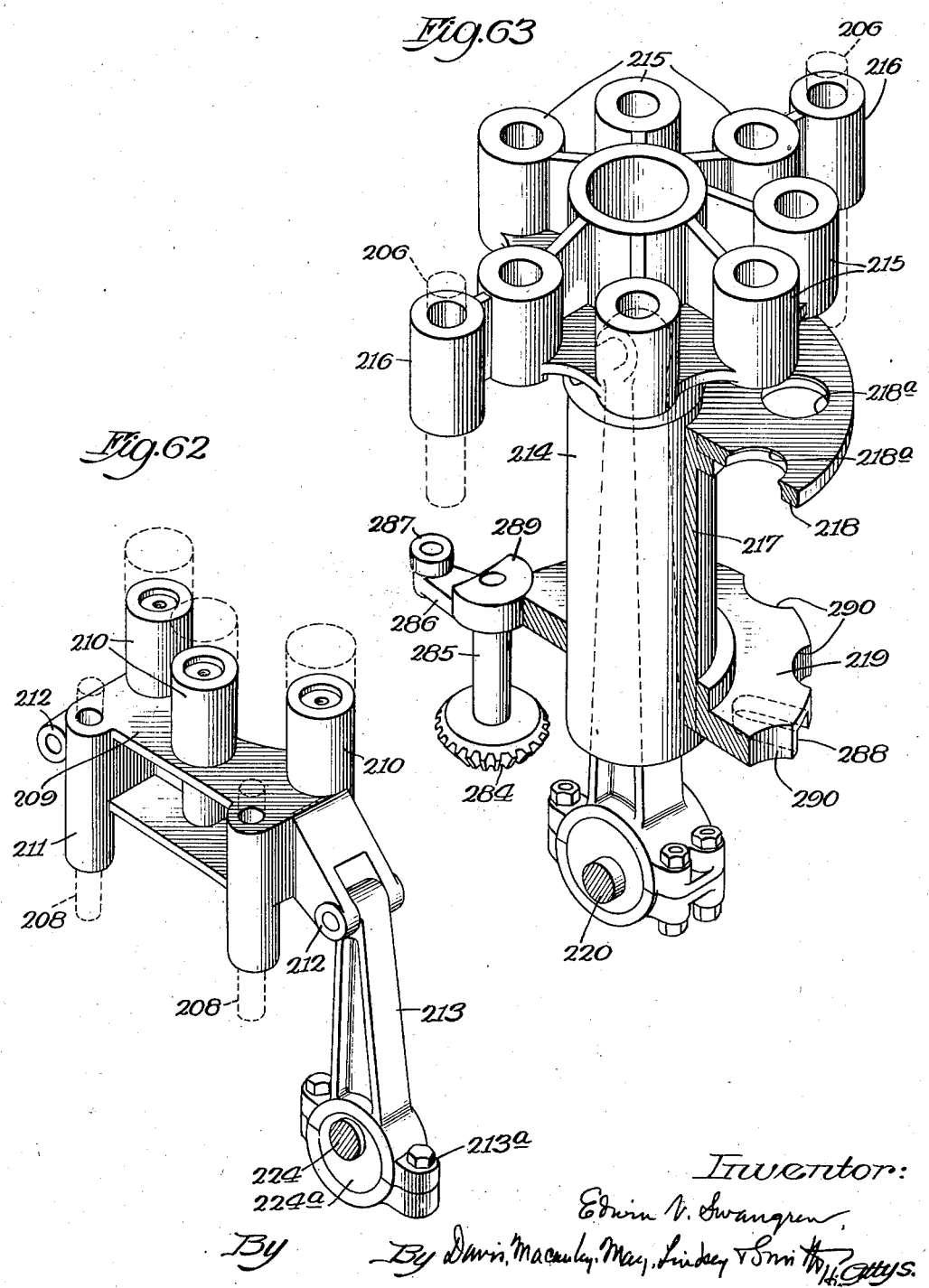

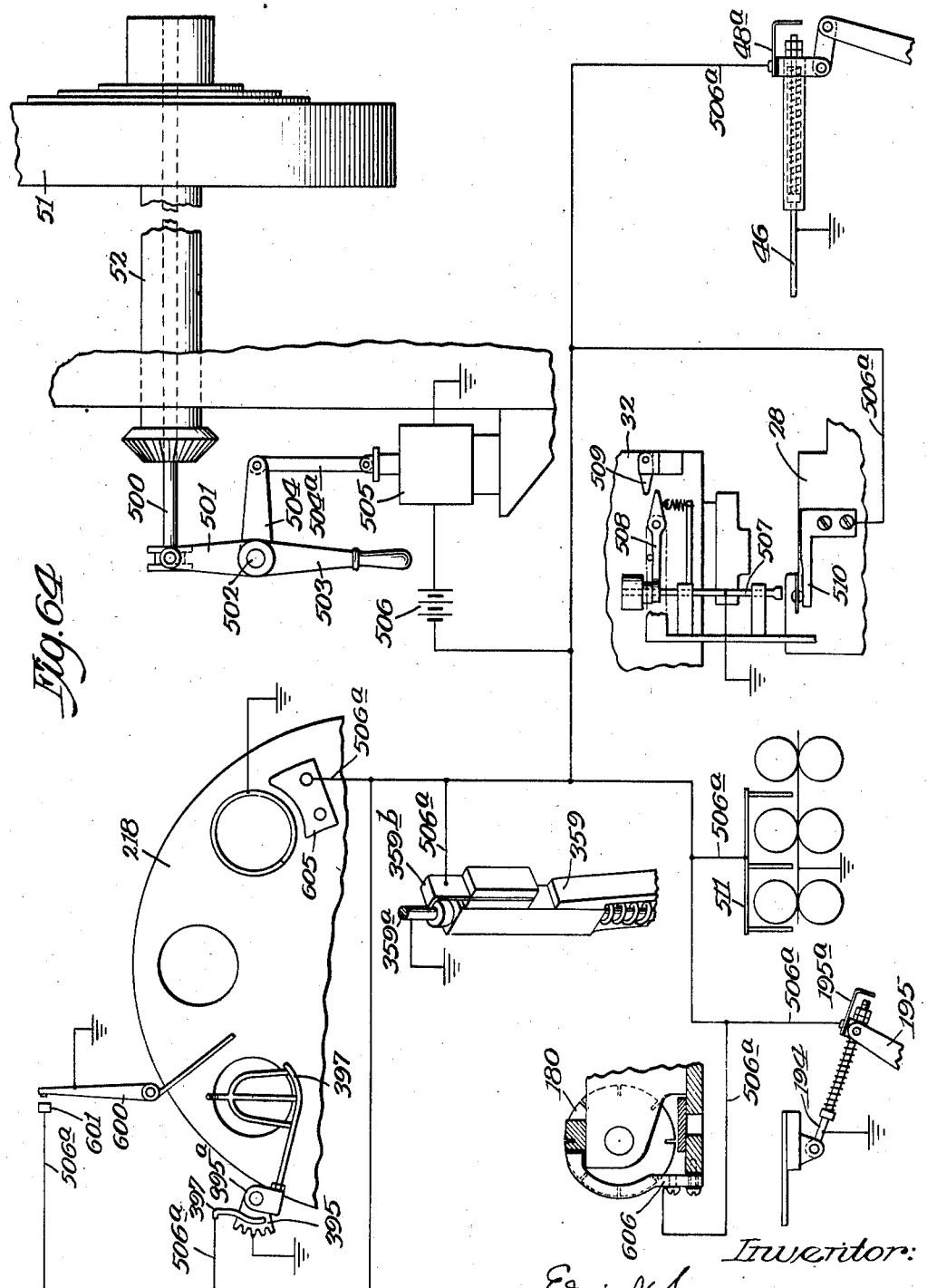

Patented Feb. 21, 1939

2,148,247

UNITED STATES PATENT OFFICE 2,148,247

MACHINE FOR FORMING CAN ENDS

Edwin V. Swangren, Chicago, Ill.

Application October 18, 1935, Serial No. 45,607

28 Claims. (Cl. 153—1)

My invention relates to a machine which I have invented and, more particularly, designed for the production on a large scale and at high speed of container covers or ends of a type consisting of a central fiber board disk connected to a sheet metal rim member, such as disclosed in Walter Patent No. 1,959,971, although certain combinations or parts and groups of mechanism in the machine may be valuable for use in machines for other purposes. Incidental to the production of a complete, organized and efficient machine for the use indicated, I have devised novel sheet-feeding mechanism arranged to intermittently feed sheets of metal supplied by an operator and present the sheets step-by-step to a novel cutting press mechanism arranged to cut from the sheets pairs of toothed strips forming the metal elements of the combination of ends, each pair being first severed and the members separated from each other and then immediately frictionally reunited with their teeth intermeshing,—this sheet feeding and cutting mechanism not being herein claimed but constituting the subject matter of a division of this application filed June 19, 1936, Serial No. 86,125.

The subject matter of the inventions to which the present application is restricted relates to a group of novel mechanisms for feeding the connected pairs of strips delivered by the cutting press mechanism described and claimed in my said divisional application; to mechanisms for separating the members of the pairs, and feeding them individually to and through a novel reversing mechanism; and a novel forming and assembling mechanism for first bending and then partially shaping the toothed strips into circular ring-shaped form; then, severally feeding the fiber disks to the ring-shaped strips and punching the teeth of the strip through the marginal portion of the disk; then bending and clinching the teeth to secure the ring to the disk; and finally ejecting the completed can ends.

The subject matter of my said invention herein claimed resides in the new organization and arrangement of the different groups of mechanical instrumentalities employed, including various new combinations and sub-combinations of co-operating parts and members relating to the separation and feeding of pairs of connected strips operated upon to form the metal rings, and mechanisms for shaping the rings, and for feeding the fiber disks and assembling them with the metal rings to form can ends, and various original details in the specific construction and arrangement of parts and elements incidental to attainment of the ends in view, as will be apparent from the description of the construction of the machine hereinafter given, the essential elements of the subject matter of the present invention being more particularly pointed out in the appended claims.

In the description hereinafter given of the machine embodying my invention as illustrated in the drawings, the front side of the machine, considered as a whole, will be regarded as that part shown at the lower side of Fig. 1, and at the right side of Fig. 3, and at the side nearest the point of view in Fig. 5; whereas in describing the movement of parts concerned in advancing the metal sheets and strips through the machine, the terms "forward" and "forwardly" will be used with reference to travel from a feeding or an intermediate advancing position towards the point of discharge of the finished can tops or ends, and "rearward" or "rearwardly" used to describe a return of parts in the reverse direction.

In the drawings

Figure 1 is a plan view of the principal parts of my new machine, certain parts being sectioned and the parts thereabove omitted;

Fig. 2 is a fragmentary plan view of the forward end of one of the metal sheets operated upon by the sheet-cutting mechanism, the line of cut made by such mechanism being indicated thereon;

Fig. 3 is a vertical section through the machine, taken in a plane indicated by the dotted line 3—3 of Fig. 1 and looking in the direction of the arrow;

Figure 15:
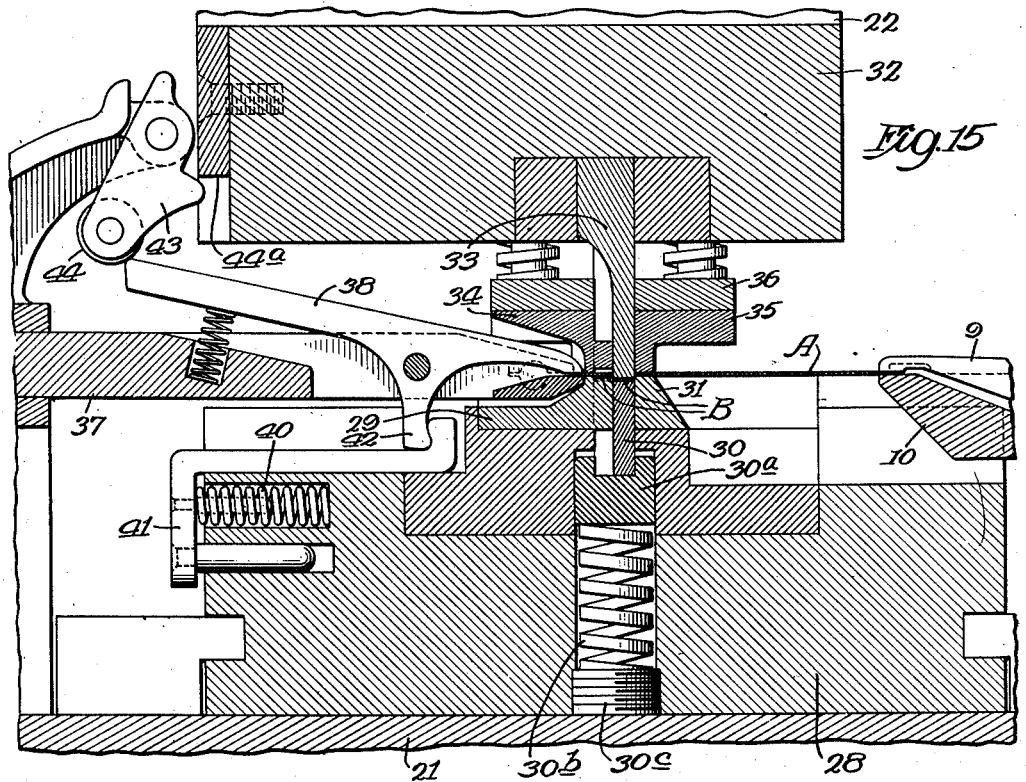
Figure 16:
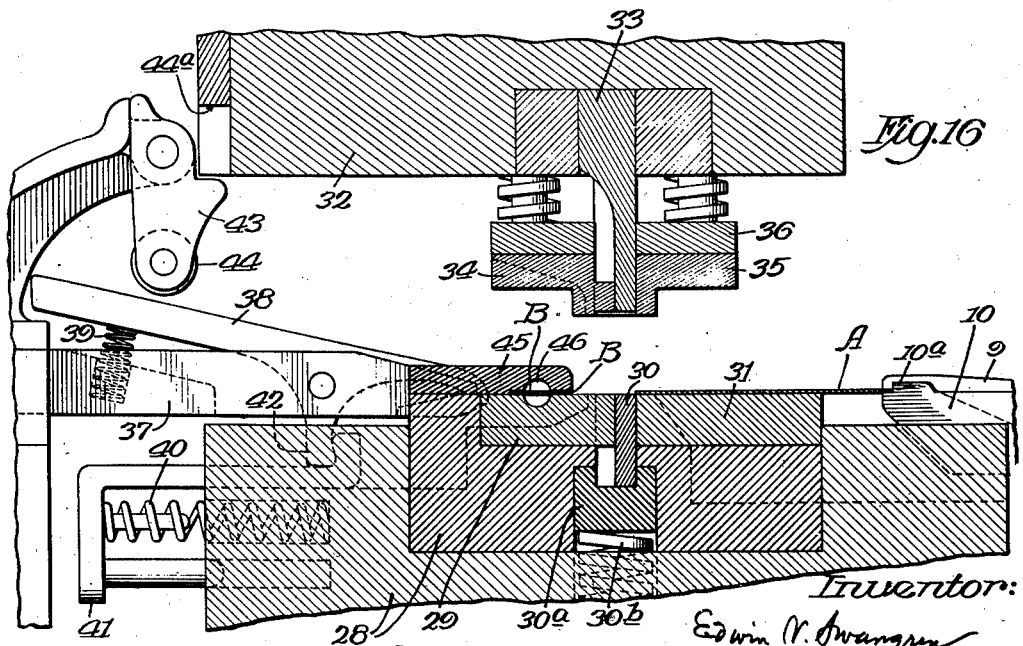

Fig. 3ª is a fragmentary detail of certain parts of the clutch on the actuating shaft of the cutting press, the plane of the section being indicated by the dotted line 3ª—3ª of Fig. 5;

Fig. 4 is a fragmentary detail, showing detached a part of the connections for setting the machine in operation after a sheet metal blank has been secured to the sheet feeding frame by the operator, and for automatically stopping the machine and reversing the movement of the feed frame when it has reached the limit of its feeding movement;

Fig. 5 is a vertical transverse section of the central portion of the machine in a plane indicated by the dotted line 5—5 of Fig. 1, looking toward the rear of the machine;

Fig. 6 is a fragmentary detail section taken axially through the central pair of separating dies, as indicated by the dotted line 6—6 on Fig. 5;

Fig. 7 is a detail in section of a pusher rod for removing the severed strips from beneath the dies of the cutting mechanism;

Fig. 8 is a plan view of the sheet-feed frame or carriage, partly broken away to better show the construction of the parts;

Fig. 9 is a vertical longitudinal section of the sheet-feed carriage and portions of the supporting frame in a plane indicated by the dotted line 9—9 of Fig. 8, looking in the direction of the arrow, and showing the feed frame at the front end of the supporting frame;

Fig. 10 is a similar section showing the carriage at the rear point of its travel;

Fig. 11 is a perspective of the feed carriage, detached;

Fig. 12 is a transverse vertical section through the feed carriage and supporting frame in a plane indicated by the dotted line 12—12 of Fig. 8, looking toward the front of the machine;

Fig. 13 is a similar section in a different plane, as indicated by the dotted line 13—13 of Fig. 8;

Fig. 14 is a fragmentary detail of parts for automatically stopping the machine and reversing the travel of the feed carriage, the parts being shown in stopping position;

Fig. 15 is a vertical section through the die blocks of the sheet-cutting mechanism and certain associated parts at the end of a cutting stroke, shown in a plane running from front to rear;

Fig. 16 is a similar view, but with the dies in separated position;

Fig. 17 is a plan view of parts at the rear central portion of the machine lying below a plane indicated by the dotted line 17—17 of Fig. 5;

Fig. 18 is a fragmentary vertical section in a plane indicated by the dotted line 18—18 on Fig. 17, looking in the direction of the arrows;

Figs. 19, 20, 21, 22, 23, 24 and 25 are fragmentary vertical cross-sections through certain rollers and guide parts connected with the steps of separating the members of the frictionally-connected double strips of sheet metal from each other and feeding the separated strips successively to the forming and assembling mechanisms in planes indicated respectively by the dotted lines 19—19, 20—20, 21—21, and 22—22 of Fig. 17, and the dotted lines 23—23, 24—24, and 25—25 of Fig. 18;

Fig. 26 is a transverse vertical section of certain parts at the rear side of the machine in a plane indicated by the dotted line 26—26 on Fig. 17;

Fig. 27 is another transverse vertical section on the line 27—27 of Fig. 17, illustrating the disposition of parts of a Geneva movement and gears associated therewith to effect intermittent movement of a strip-transfer drum employed for reversing the position of the cut strips before they are delivered to the forming mechanism;

Fig. 28 is a horizontal section through the forming and assembling or "turret" section of the machine, immediately above the level of the intermittently rotated section of the carrier plate or turret of the machine;

Fig. 29 is a horizontal section illustrating the arrangement and organization of bending elements and associated parts adjacent the first work station of the turret section of the machine;

Fig. 30 is a fragmentary view showing in perspective one of the diagonal bending slides;

Fig. 31 is a detail vertical section illustrating the construction of a vertically movable guide-plate element adjacent the first work station of the turret section of the machine;

Fig. 32 is a vertical cross-section of parts shown in Fig. 29, in a plane indicated by the dotted line 32—32 on said figure;

Fig. 32ᵃ is a vertical cross-section of parts shown in Fig. 29, in a plane indicated by the dotted line 32ᵃ—32ᵃ on said figure;

Fig. 32ᵇ is a perspective view showing the under side of a stationary guide block shown in Figs. 29 and 32ᵃ;

Fig. 33 is an elevation of the left side of the machine;

Fig. 34 is a detail showing a side view of certain connections detached, actuated by cams on three interconnected shafts near the right or inner ends of said shafts;

Fig. 35 is a vertical section of the turret section of the machine, in a plane indicated by the dotted line 35—35 of Fig. 28, looking in the direction of the arrow;

Fig. 36 is a vertical section of the same part of the machine, the plane of section being indicated by the dotted line 36—36 of Fig. 28;

Fig. 37 is a top plan view showing parts below planes indicated by the dotted line 37—37 in Fig. 36, parts intersected by said planes being shown in section;

Fig. 38 is a fragmentary vertical section of parts carried by a shaft shown in Fig. 37, the line of section being indicated by the dotted line 38—38 on said figure;

Fig. 39 is a perspective view of connections for controlling the actuation of a reciprocating slide for feeding the paper disks to the rings of sheet metal carried by the carrier plate;

Fig. 40 is an end view (looking towards the rear of the machine), of certain parts illustrated in Fig. 39;

Figs. 41 and 42 are fragmentary perspective views showing detached certain parts shown in Fig. 39;

Fig. 43 is an axial section of the upper and lower die members at the first work section of the strip-bending mechanism;

Fig. 44 is another axial section of the same parts in different position;

Fig. 45 is an enlarged fragmentary section illustrating the final action of said die members in flaring the upper edge of the sheet metal ring;

Fig. 46 is a similar axial view of the upper and lower dies at the second work station;

Fig. 47 is an enlarged fragmentary view of said last mentioned dies at the end of their working stroke;

Fig. 48 is a view corresponding to Fig. 46 at the third work station;

Fig. 49 is a view of the dies at said third work station corresponding to Fig. 47;

Fig. 50 is a view corresponding to Figs. 46 and 48, at the fourth work station;

Fig. 51 is a view of the dies at said last mentioned station corresponding to Figs. 47 and 49;

Fig. 52 is a horizontal section showing parts of the lower die and the slide for feeding the fiber disks to the die at the fifth work station, the plane of section being indicated by the dotted line 52—52 of Fig. 53;

Fig. 53 is a vertical section extending axially through the upper and lower dies at the fifth work station and illustrating the same portion of the machine as shown in Fig. 52;

Fig. 54 is a fragmentary vertical section on a larger scale, showing the position of the upper and lower dies and interposed metal ring and disk at the end of the movement of the dies at said fifth work station;

Fig. 55 is a fragmentary vertical section in a plane indicated by the dotted line 55—55 of Fig. 52;

Fig. 56 is a view corresponding to Fig. 46, at the sixth work station;

Fig. 57 is a view corresponding to Fig. 47, at the sixth work station;

Fig. 58 is a view corresponding to Fig. 56, at the seventh work station;

Fig. 59 is a view corresponding to Fig. 57 at the seventh work station;

Fig. 60 is a view of upper and lower elements at the eighth work station;

Fig. 61 is a perspective of the main frame of the turret section of the machine; the mechanism supported thereby being omitted;

Fig. 62 is a perspective of one of two lifting frames employed for supporting the lower die elements and associated parts;

Fig. 63 is a perspective of a lifting frame for supporting the upper die elements, and illustrating also a carrier table for conveying the bent strips of metal while they are being formed and assembled with the fiber disks; and Fig. 64 illustrates, partly in diagrammatic form, certain electrical devices and connections employed to stop the machine under abnormal conditions which may occur at different points and which might result in breakage if the machine were to continue in operation.

Like reference characters indicate like parts in all the figures of the drawings.

Before proceeding to a detailed description of the machine illustrated in the drawings it may first be explained generally that it is entirely automatic in its operation except for the attention required of an operator in placing successive sheets of metal in the machine when the cutting press stops after each sheet has been completely cut up into strips and the feed frame or carriage has been automatically returned from its forward position adjacent to the cutting mechanism to rearward position and there stopped to permit a new sheet to be placed in the feed frame, and in then manually starting the machine again.

When thus started, after insertion of a fresh sheet, the sheet-feeding frame or carriage intermittently moves forward, and between each step in its movement the cutting mechanism severs from the forward edge of the sheet a rectangular portion of sheet metal and cuts the same into two intermeshing toothed sections or strips which are momentarily separated by the cutting press mechanism and then frictionally reunited by their mating, intermeshing toothed edges. The pairs of strips thus formed are first shifted forwardly in advance of the cutting dies, and then transferred laterally while connected with each other, and after being separated the strips are individually fed forward into the grooves of an intermittently rotated reversing drum, after which they are delivered to bending and shaping mechanisms including upper and lower shaping and bending dies and an intermittently rotated carrier table or turret by which the strips are presented to the dies at successive work stations and are bent into circular shape and the teeth crimped and bent in successive stages to receive the fiber disks, which are imposed upon the formed disks at an intermediate work station and the teeth of the bent strip forced through them. The teeth of the strip are then bent and clinched to the disks at subsequent work stations, and lastly the completed ends are delivered through a discharge chute to a suitable magazine.

The clutch elements through which the different mechanisms (which must be operated in timed relation) are connected and started and stopped are of such construction as to make operative engagement only at a definite angular relation to each other, whereby the timing of the parts may be adjusted to operate in synchronism with each other.

The stationary frame of the machine may consist of frame parts and sections of any suitable construction secured together in any desired manner and provided with bearing brackets and supporting parts suitably formed and arranged to accommodate the moving parts of the machine. In the particular machine illustrated the cutting press frame is constructed as a structural unit to which the supporting frame of the sheet-feeding carriage is hinged and adapted to be bolted, and the frame supporting the frame of the forming and assembling mechanism, or "turret frame", may be regarded as another unit. The cutting press frame and the turret frame are rigidly secured together by intermediate connecting frame plates and brackets formed to receive the parts of the intermediate strip separating and transferring mechanisms.

*Sheet-feeding mechanism*

Describing now in detail the machine embodying my invention illustrated in the drawings, the hinged sheet-feed supporting frame before mentioned includes a pair of horizontal side members 1, a pair of vertical rear members 2, a pair of inclined side members 3, cross-members 4, and suitable bracket and other supporting members to support the moving parts of the sheet-feeding mechanism. The frame as a whole is pivoted to the cutting press frame upon vertical pivots 5 and is secured to the last mentioned frame in fixed position by bolts 6 which may be removed to permit the sheet-feed frame to be swung aside so that access may be had to the dies and other adjacent parts of the cutting press,—see Figs. 1, 3 and 8.

Slidingly mounted in the pivoted supporting frame is a feed frame or carriage 8 (see Figs. 11, 8, 9 and 10) equipped with pivoted spring-pressed grippers 9, which carriage is shifted rearwardly of the machine with a step-by-step movement, and returned by a continuous movement through connections later to be described.

The sliding feed frame includes side bars 10 slidingly engaging track-rails 11 carried by the supporting frame, and a rear cross-bar or stop bar 12, the ends of which project oppositely beyond the side-bars,—see Fig. 11. At the front end of the sliding feed frame the spring-pressed grippers 9 before mentioned are pivotally mounted in slots in the side bars 10 of the feed carriage, and their front ends are arranged to grip the sheets A to be operated upon, which are inserted (when the sliding frame is in rearmost position) by the operator between pairs of opposite upper sheet guides 13 and lower guides 13$^a$, carried by the supporting frame, the rear end of the guides 13 being bent upwardly to facilitate insertion of the sheets,—see Figs. 8, 9 and 10.

The front ends of the grippers 9 project beyond shoulders 10$^a$ on the side-bars 10 which serve to position the sheets A accurately against the front ends of such bars and provide a clamping face to cooperate with the grippers. The front or inner ends of the sheet guides 13 and 13$^a$ extend nearly to the plane of the cutting members of the cutting press later to be described, and at the forward end of travel of the feed frame the side-bars 10 extend into recesses formed in the frame members of the cutting press and the lower die back of said press,—see Figs. 9 and 10.

When the feed frame returns to rearward position, after the sheet secured by the grippers has all been cut into strips (except a narrow waste strip clamped by the grippers) the gripper jaws are automatically released at a point above a waste opening 14 in the carriage frame through the camming action of a pair of flatsided disks 17 secured to a rock shaft 16 journaled in supporting frame; which, when their curved peripheral surfaces are lowermost, as shown in Fig. 10, lie in the path of the grippers and force their rear ends downwardly as the feed frame returns to rearward position, thus releasing the gripper jaws. After a fresh sheet has been inserted in the sheet guides 13—13ª the rod 16 is turned by a hand-lever 18 (see Figs. 3 and 8) to turn the flat faces of the disks 17 to the lowermost position shown in Fig. 9 and permit the jaws of the grippers 9 to clamp against the inserted sheet. As the feed frame afterwards advances in its feeding movement the rock shaft 16 and disks 17 are returned to the position shown in Fig. 10 by engagement of the cross-bar 12 of the feed frame with a short rock arm 15 secured to the rock shaft.

At the rear end of the supporting frame I have arranged in convenient position a magazine 19 for reception of a stack of sheet metal blanks A, and adjacent thereto a feed table 20 having a surface adapted to direct individual sheets taken from the stack into proper position between the sheet guides 13 and 13ª.

*Cutting press mechanism*

The mechanism for cutting the blanks A and severing the cut-off portions to form pairs of strips B—B, and then separating and immediately frictionally reuniting the strips and then delivering the reunited pair of strips successively to the strip-separating and transfer mechanism will next be described. The cutting press which operates to separate the sheet metal blanks into strips is of a well known type, employing lower dies stationarily supported in the bed 21 of the cutting press frame and upper dies carried in a vertically reciprocating head 22 which is slidingly mounted in guideways in guide members 23 of the frame and actuated by a pitman 24 having an eccentric strap engaging an eccentric 25 on the main cutting press actuating shaft 26.

The pitman, it may here be noted, is adjustable in length, to provide for exact adjustment and replacement with dies of different length and shape as may be required by changes in the machine to adapt it for operation in producing can tops of different sizes. This adjustment is effected by loosening bolts 27 which secure together upper and lower sections of the pitman, one of the sections being slotted to permit adjustment as desired, and then bolting the sections together in the desired position of adjustment.

The lower cutting members of the cutting press may conveniently be mounted in a lower die-block 28 (see Figs. 15 and 16) stationarily mounted in the bed of the cutting press frame, and consist of a stationary forward die member 29, an intermediate yieldingly mounted die member 30, and a rear stationary die member 31, all being elongated bars extending transversely under the front edge of the sheet metal blanks to be operated upon. The rear edge of the yielding die member is straight and the forward edge toothed, or corrugated, to correspond with the outline of the intermeshing teeth between the two members of the double strip to be severed by the cutting operation,—see Fig. 2. This intermediate yielding member is mounted upon a supporting bar 30ª, stressed by a pair of springs 30ᵇ, confined between such bar and plugs 30ᶜ seated in the lower die block 28. The forward lower die member 29 is formed along its rear side (the side extending toward the front of the machine) with corresponding teeth mating with the complementary teeth on the intermediate die member, said die member thus forming an anvil underlying the forward strip B of the double strip to be severed, while the rear die 31 forms an anvil under the portion of the sheet metal blank to the rear of the rear strip B, and the yielding intermediate die is of the same outline as such rear strip B and underlies it.

The upper cutting members of the press may likewise be conveniently mounted, as illustrated, in an upper die block 32, secured to the reciprocated head 22 of the press. The intermediate punch member 33, which forms the cutting tool and is of the same outline as the yielding lower die 30 beneath it, is formed with a straight rear edge arranged to cooperate with the edge of the lower rear stationary die member 31, and a toothed or corrugated forward edge adapted to cooperate with the correspondingly toothed edge of the lower forward stationary die member 29.

On opposite sides of the cutting member 33 are arranged yieldingly-supported forward and rear clamping and stripping members 34 and 35, respectively, which may conveniently be supported, as shown, by a spring-pressed bar 36 which slidably engages the punch tool 33. As the die head descends the rear clamping member 35 is arranged to clamp the sheet metal A against the lower rear stationary die member 31 immediately to the rear of the rear line of cut of the punch member 33, while the forward clamping member is arranged to clamp the forward one of the strips B to be severed from the sheet against the lower forward stationary die member 29 immediately forward of the line of the toothed intermeshing portions of said strips.

It may now be explained that upon descent of the cutting press head the forward portion of the blank A is severed from the body of the sheet, and this portion is also severed into two strips B—B, and the rear strip B is forced downwardly a short distance below the plane of the forward or mating one of the two strips, against the stress of the springs 30ᵇ (see Fig. 15). As the punch head ascends these springs 30ᵇ restore the rear strip, now completely severed, to the same plane as the front strip, which it frictionally engages, and as the punch continues to ascend the springs tensioning the holding and clamping members 34 and 35 of the punch act to strip the reconnected strips B—B from the intermediate upper punch tool, so that the connected double strip is free to be acted upon by grippers mounted upon a pair of simultaneously reciprocating bars next to be described, and thus withdrawn from the zone of the punching mechanism. The contour of the teeth is such that when the severed parts are reunited they will resist separation sufficiently to enable them to be handled as a unit, but may be separated by mechanism later to be described. In practice frictional engagement has been found sufficient, but if desired, a slight interlocking engagement may be provided by giving the teeth appropriate contour.

The reciprocating bars mentioned, marked 37, are slidingly mounted in recesses in the fixed frame members of the cutting press and the lower die block 28, and are severally equipped with rocking gripping members 38, disposed within top recesses formed in the inner ends of such bars. These bars are tensioned by springs 39 to stress the jaws at their inner ends into gripping relation with the inner ends of the bars,—see Figs. 15 and 16. The inner portions of said bars 37, it may here be explained, are shouldered in the same manner as the forward ends of the side-bars 10 of the feed frame or carriage 8 before described, to form a stop for the forward edge of the sheet metal blank as it is advanced by the sheet-feeding mechanism. In the present instance the tension of the springs 39 is supplemented by springs 40 acting against a sliding frame 41 having a hooked member engaging a short depending arm 42 on the gripper.

Above the path traversed by each gripper 38 is arranged a rocking cam block 43, pivotally mounted on a bracket carried by the frame of the punch press and equipped with a cam roller 44. Each block 43 is formed with a shoulder arranged to cooperate with a shoulder 44a forming the upper part of a recess in the head structure adjacent the upper die block 32. The construction and arrangement of the parts is such that as the bars move forwardly from the position shown in Fig. 16 to the position shown in Fig. 15, while the press head is raised, the two grippers will be cammed to open position. After the metal sheet has been advanced to forward position and stopped against the shouldered ends of the bars 37, and as the press head then descends, the shoulder 44a on the press head rocks the two cam blocks outwardly, and when the rollers 44 clear the grippers 38, the springs 39 and 40 will act to quickly restore the grippers to clamping position of the jaws against the forward portion of the sheet A which is to be severed by the punch press and becomes the forward one of the pair of connected strips B—B. This clamping engagement continues while the cutting operation proceeds as above described, and after the severed rear strip B of the double strip has been restored to reengagement (now frictional) with the front strip, the reciprocating bars shift outwardly and carry the double strip beneath recesses in aligned stop bars 45 arranged forwardly of the punching members, the grippers riding off the upper faces of the strips in the further movement of the bars 37. The cam blocks 43 are free to rock to permit the grippers 38 to ride under them, after which they gravitate to the vertical position shown in Fig. 16.

During the interim between the outward movement of the bars 37 and grippers 38, after they have pulled the connected two-piece strip underneath the recesses in the stop bars 45 and have passed out of engagement with the strips, and the return inward movement of such bars, the double strip B—B is shifted transversely out of the path of the next strips to be severed by the quick movement of a push rod 46 slidingly mounted in a stationary bracket 47 on the stamping press frame and extending through stationary parts of such frame. This push rod, to avoid breakage in case of jamming of the strips, is mounted in a spring barrel 48 through which it is actuated,—see Fig. 7.

Connections for operating sheet-feed and cutting press mechanisms

The operating connections through which the parts thus far described are actuated may next be described.

The driving pulley of the electric motor 49 employed in the present instance as a source of power is connected by a belt 50 with a pulley 51 arranged to be clutched to the main power shaft 52 of the machine,—see Figs. 3 and 5. The shaft 52 carries a small gear wheel 53 meshing with a large gear wheel 54, the hub of which is rotatably mounted upon the cutting press actuating shaft 26 before referred to, and is arranged to be clutched thereto and disconnected therefrom, as will later be more fully explained.

The sheet-feed frame is given its intermittent, forward, feeding movement through an eccentric 55 on the cutting press shaft, the strap 56 of which is connected by a pitman rod 57 with an oscillating pawl-carrying arm 58 carrying a pawl 59 cooperating with a ratchet wheel 60 rotatably mounted on a shaft 61 journaled in the opposite side members of the pivoted supporting frame in which the feed frame or carriage for feeding the sheet metal blanks is slidingly mounted,—see Fig. 3. The ratchet wheel 60 is arranged to frictionally rotate the shaft 61 with provision for a desirable amount of slippage at each movement of the ratchet wheel through a friction disk 62 engaging the side face of a disk 63 secured to said shaft, and means are provided for regulating the resistance to slippage consisting of a flanged collar 64 bearing against the ratchet wheel and stressed by a spring 65 which may be varied in tension by adjusting nuts 66. The collar 64 also serves as a pivot for the ratchet arm 58,—see Fig. 12.

To the shaft 61 is secured a pair of sprocket wheels 67—67 (see Figs. 9, 10 and 12) which are connected by sprocket chains 68—68 with a pair of rear sprocket wheels 69—69. The rear crossbar of stop bar 12 of the feed frame or carriage is connected by a pair of opposite depending lugs 70—70 with the upper reach of the sprocket chains, so as to be shifted thereby. The actuation of the ratchet wheel thus brings about a step-by-step forward movement of the feed frame, and as the stroke given the pawl is slightly in excess of the required feeding movement the leading edge of the sheet metal blank is forced firmly against the stop shoulders formed on the inner ends of the reciprocating bars 37 which carry the grippers 39, a slight slippage between the friction disk 62 and the disk 63 occurring after the sheet has been thus accurately stopped in proper position between the die members of the cutting press mechanism.

At the end of the final feeding stroke the feed frame has been shifted to the extreme forward position shown in Fig. 10, and after the cutting mechanism has severed the last double strip from the sheet metal blank being operated upon, the carriage is returned to rearward position (at the front side of the machine) by the following connections. The main operating shaft 52 of the machine, which during the running of the machine is continuously driven by the motor, carries a bevel gear wheel 71 meshing with a bevel gear 72 secured to a vertical shaft 73 journaled in suitable bearings carried by the cutting press frame. Secured to the lower end of this shaft is a bevel gear 74 meshing with a bevel gear 75 on a horizontal shaft 76 at the rear side of the machine.

To this shaft 76 is secured a gear wheel 77 meshing with a pinion 78 on a shaft journaled in the frame of the machine, and this pinion meshes with a large gear wheel 79 secured to a horizontal shaft 80 extending transversely of the machine near its base, and which it may here be stated drives the mechanisms arranged in the turret section of the machine and certain intermediate mechanisms. Near the outer end of this shaft 80 there is secured thereto a sprocket wheel 81 engaging an upwardly and forwardly extending sprocket chain 82 which is also engaged by a sprocket wheel 83, the hub 84 of which rotatably engages a shaft 85, and carries one member 86 of a cone clutch which is adapted to cooperate with a sliding clutch member 87 having splined connection with said shaft 85. The rear pair of sprocket wheels 69—69 before mentioned, which it will be remembered are engaged by the sprocket chains 68—68 connected to the feed frame, are secured to the shaft 85, and when the clutch members 86 and 87 are engaged this feed frame will be returned by the connections just described.

During the forward or feeding movement of the sheet-feed frame, the clutch members last referred to are of course out of engagement, and they are automatically reengaged through connections controlled by the return stroke of the sheet-feed actuating pawl-carrying arm 58 after the carriage has reached forward position and after the final double strip has been severed from the blank at the time being operated upon.

For the purpose of interrupting the action of the cutting press while the sheet-feed frame is being returned to rearward position, I have provided a rock shaft 88 journaled in bearing brackets 89—89 on the supporting frame for the traveling feed frame and carrying a pair of depending rock arms 90—90 in the path of the stop bar of the feed frame arranged to rock the shaft 88 at the last forward strip of such frame,—see Figs. 3, 12 and 14. This rock shaft 88 has secured to its outer end (see Figs. 4, 5, 8 and 12) a rock arm 103 pivotally connected to a rod 104 which is connected to a spring tensioned blocking lever 105 pivoted at its top to a pivot carried by a frame member of the press. The lower end of this lever is formed with an arcuate face adapted to cooperate with a roller intermediately mounted upon a lever 106 which is pivoted at its rear end to the punch press frame and connected by a rod 106ᵃ to a foot treadle by which it may be drawn downward. The front of the lever 106 is connected to a rod 107 which at its upper end is connected to a disengaging latch 510 stressed upwardly by a spring 511 (see Fig. 3ᵃ), but normally maintained in lower, inoperative position by means of the blocking lever 105 while the cutting press is operating and while the cutting press shaft is clutched to the constantly driven large gear 54 rotatably mounted on said shaft.

The clutch employed to connect the gear 54 to the press shaft 26 is of a well known type permitting engagement of the driving and driven members at a single point only of angular relationship. It will suffice here to explain that the hub 54ᵃ of the large gear wheel 54 is formed with a socket adapted to make engagement with a locking pin 508 slidingly mounted in the hub 509 of the driven member 108 of the clutch, which latter is secured to the shaft 26. The pin is stressed by a compression spring towards the hub 54ᵃ, and is arranged to normally engage the socket of the hub 54ᵃ of the gear wheel to lock the gear wheel to the shaft while the cutting press is in operation.

The locking pin 508 is formed with a cam face arranged as the clutch elements rotate to be carried into contact with a cam face on the spring-stressed rocking latch 510 when the latter reaches its upper position, see Fig. 3ᵃ, which latch, it will be remembered, is normally held by the rod 107 and blocking lever 105 in lower position out of path of movement of the pin while the cutting press continues to operate.

When the shaft 88 is rocked (either by the rock arms 90—90 at the end of the last feeding movement of the feeding carriage, or a handle 88ᵃ provided for manual operation, if desired) to disengage the blocking lever 105 and permit the rod 107 and latch 510 to rise, the cam face of the latch will be brought into the path of movement of the cam face on the locking pin 508 and cause a delayed disengagement of the clutch after the final stroke of the cutting press has been completed and when the cutting elements of the press have reached uppermost position, the gear wheel 54 continuing thereafter to rotate idly upon the shaft 26.

When it is desired to start the machine again, after the insertion of a fresh sheet, the foot treadle is operated to draw the lever 106, rod 106ᵃ and connected rod 107 downwardly, thus shifting the latch 510 to inoperative position, and at the same time restoring the blocking lever 105. Reengagement of the clutch elements obviously will not take place until the gear 54 has rotated to the single position of engagement of the clutch members, thus restoring the timed relationship of the parts for proper operation of the machine.

The rocking of the shaft 88 serves not only to effect delayed disengagement of the cutting press mechanism, and consequently the forward intermittent feed of the sheet-feed frame which is connected by pawl and ratchet to the cutting press shaft 26, but also serves to effect engagement of the clutch members 86 and 87 in the train of connections by which the sheet-feed frame is returned to rearward movement, through a connection controlled by the final return stroke of the pawl carrying arm 58.

To this end the rock shaft 88 carries a rock arm 91 (see Fig. 14) to which is pivoted a swinging cam plate 92 adapted to drop behind a roller 93 carried by the lower end of a lever 94 intermediately pivoted on the supporting frame. The pawl-carrying arm 58 is formed with an extension 58ᵃ equipped with a cam roller 94ᵃ adapted to cooperate on the return movement of the pawl arm with a cam surface formed on the front face of the cam plate 92 and force the lower end of the lever 94 towards the front of the machine, thereby pulling in the opposite direction a connecting rod 95 which is adjustably connected to a bell-crank lever 96 at the outer end of the stationary supporting frame,—see Figs. 14 and 8. Through a link 97, a bell-crank lever 98, a second link 99, and a second bell-crank lever 100, one end of which is equipped with a pin 101 engaging a groove in the hub of the sliding clutch member 87, the latter is shifted into engagement with the cooperating clutch member 86 to transmit power to the shaft 85 and connected parts when the return movement of the pawl-carrying arm 58 occurs,—see Fig. 8.

The bell-crank lever 96 is preferably provided with a handle 96ᵃ to enable the operator to return the carriage or feed frame at any point in its travel which may be desired,—see Figs. 3 and 8.

As the feed frame reaches the limit of its return movement the outer end of the stop bar 12 of the frame contacts a roller 102 on the pivot of the joint between the bell-crank lever 98 and link 99, and through such link and the connected bell-crank lever 100 shifts the movable clutch member 87 to disengaging position, (see Fig. 8) the feed frame then coming to rest into position for another sheet to be inserted by the operator.

It will be understood that the angular relation of the eccentric 25 through which the cutting press head is reciprocated, and the eccentric 55 through which the ratchet mechanism is operated to give the sheet-feed frame its step-by-step movement, and the cam 131 by means of which the bars 37 and rear grippers 38 are actuated to withdraw the connected several strips from the zone of the cutting members of the press, all of which are secured to the cutting press shaft 26, is such that the sheet metal blank will be fed forwardly into position to be operated upon while the press head is in upper position, and that the pawl of the ratchet mechanism will be retracted while the press head is in lower position, and also that the movement of the bars 37 is so timed as to start removal of the strip immediately after the upper die members have cleared them and, after the rear grippers have cleared the upper face of the leading strip and the push rod 46 has been reciprocated to quickly eject the pair of strips, the bars will then return to inner position, camming the grippers 38 upwardly in time to permit the leading edge of the succeeding pair of connected strips to stop against the stop shoulders of the grippers, after which the descending press head acts upon the cam blocks 43 to cause the grippers 38 to quickly snap into clamping engagement against the strips, as before described.

Connections for operating rear grippers

The reciprocating bars 37 carrying the grippers 38 by means of which the two-part adherent strips are withdrawn from between the cutting members of the press are actuated in synchronism with such members and given the timed movements before described through a cam 131 which is secured to the main cutting press shaft 26 and is formed with a side groove arranged to receive a cam roller carried by the upper end of a rocking lever 132 pivoted at its lower end to a block 133 confined between a stop 134 and a spring 135 on a connecting rod 136 which at its lower end is pivotally connected with a rock arm 137 fixed to a rock shaft 138 journaled in bearings carried by the punch press frame. To this rock shaft are secured two depending arms 139 which through links 140 are severally connected to the bars 37.

Inasmuch as the inner ends of the bars 37 are shouldered to serve as stops to position the leading edge of the metal sheet under the cutting mechanism, it is important that they shall be stopped with accuracy. To provide for this the outer ends of the bars are equipped with lugs 37ª engaged by adjusting bolts 37ᵇ which bring up against a contact face on the cutting press frame and limit the stroke accurately. The yielding connection between the lever 132 and rod 136 provided by the spring 135 stresses the bars into the exact position of adjustment given by the bolts and provides for some range of adjustment.

Connections for operating strip-ejectors

The push rod 46 which acts to shift the frictionally adherent strips cut from the sheet metal blank laterally after they have been punched apart and reunited is operated through a sprocket wheel 120 secured to the outer end of the shaft 80 which engages a sprocket chain 121 also engaged by a sprocket wheel 122 rotatably mounted in a bearing bracket 123 fixed to the punch press frame. To the hub of this sprocket wheel is fixed a bevel gear 124 meshing with a bevel gear 125 secured to a short shaft 126 journaled in the bearing bracket 123 and a similar bracket 123ª, also fixed to the cutting press frame,—see Figs. 1 and 5. A cam 127 secured to the shaft 126 is formed with a side cam groove arranged to receive a cam roller 128 intermediately mounted on an oscillating lever 129 which is pivotally mounted at its lower end upon the bearing bracket 123ª and at its upper end is connected by a link 130 with the end of the spring barrel 48 to which the push rod 46 is connected.

Mechanism for separating and transferring the punched strips

Coming now to those portions of the machine which particularly constitute the subject matter for the claims herein made, the mechanism for separating the pairs of connected strips delivered by the push rod 46 of the cutting mechanism and feeding the individual strips successively to other instrumentalities will next be described. The pairs of strips are successively projected by the push rod mentioned in the manner hereinbefore described into the bite of a pair of upper and lower tensioned friction rollers 141—141ª (see Figs. 17 and 19) having flat faces. From this pair of rollers the strips pass forwardly to an intermediate pair of tensioned rollers 142—142ª having complementary faces formed at an oblique angle on opposite sides of the center line of the rollers (see Figs. 17 and 20), and from the intermediate pair the strips pass to a third pair of similar rollers, 143—143ª, having their complementary faces standing at a yet sharper angle,—see Figs. 17 and 21. It will be noted that the axis of the intermediate roller is somewhat lower than that of the rear roller, and that the axis of the forward roller is yet lower, so that in effect the bases or straight edges of the strips are forced downwardly, and by this means the pairs of adherent strips are separated from each other and delivered into the rear end of a pair of upper and lower guide plates, 144—144ª, which further guide the strips and at the front end of the plates bring them into parallelism with their teeth standing uppermost.

All of the rollers above described (except the lower intermediate roller) are fixed to short horizontal shafts interconnected by gearing in such manner as to continuously drive the surfaces in contact with the strip forwardly, and in order to provide for tensioning the different pairs of rollers, the shafts of the upper rollers are mounted each in a bearing block $a$ pivoted at one end to the supporting frame and stressed downwardly by a spring $b$ confined in a socket in a cover block bolted to said frame,—see Fig. 6 for a detail of the construction of the intermediate pair. To drive the rollers, the shaft 145ª of the lower intermediate roller (which extends beyond the others towards the rear of the machine,—see Figs. 5, 6 and 17), is equipped with a sprocket wheel 145ᵇ driven by a sprocket chain 145ᶜ which is connected with a shaft 429 mounted in the turret frame of the machine, as will later be explained. The shaft 145ª is provided with a pinion 146 arranged to mesh with forward and rear pinions, marked, respectively, 147 and 148, on short horizontal shafts parallel with the roller shafts and similarly journaled in a frame block forming part of the cutting press frame (see Figs. 5 and 17). The forward pinion 147 meshes with a pinion 143$^b$ fixed to the shaft of the lower front roller 143$^a$, and the rear pinion 148 meshes with a pinion 141$^b$ fixed to the shaft of the lower rear roller 141$^a$. The pinion 143$^b$ meshes with a pinion 143$^c$ on the shaft of the upper front roller 143; the pinion 146 before mentioned meshes with a pinion 142$^c$ on the shaft of the upper intermediate roller 142, and the pinion 141$^b$ meshes with a pinion 141$^c$ on the shaft of the upper rear roller 141, all the feed rollers thus being driven through the pinion 146.

After the separated sheet metal strips have cleared the rollers 143 and 143$^a$, they come to rest between the guide plates 144—144$^a$ with their central portions in the nearly upright position shown in Fig. 23 and their front ends in the vertical position shown in Fig. 24, at which point they are engaged, first one of the pair and then the other, by one or the other of two horizontally disposed gear wheels, 150 and 151, secured to shafts rotatably mounted in bearings formed on an oscillating frame 152 which is rotatably mounted on a vertical pivot 153 carried by a frame bracket 154 forming part of the machine frame,—see Figs. 5 and 17. The upper guide plate 144 is cut away at the sides opposite the gear wheels 150 and 151 to permit such engagement, and the gear wheels are driven at twice the linear speed of the friction rollers above mentioned.

The frame 152 is oscillated (see Fig. 17) through a rod 155 pivotally connected to a lug on the side of the frame and having (for purposes of safety in case of jamming of the strips) a yielding spring connection 156 with one member of a stationarily-pivoted bell-crank lever 157, the other member of which is equipped with a cam roller 158 arranged to engage a peripheral groove in a cam 159 operatively connected through speed-reducing connections with a shaft 160 equipped with a sprocket wheel 160$^a$ at its inner end by which it is driven through connections with a shaft 423 mounted in the turret frame, as later to be described,—see Fig. 26.

In order that the cam 159 may be rotated once during each two rotations of the shaft 160 (see Figs. 17 and 26) this cam is loosely mounted on said shaft, and the shaft has secured to it a small pinion 159$^a$ meshing with a larger pinion 159$^b$ loosely mounted on a short shaft parallel with and below the shaft 160, the pinion 159$^b$ being secured to a smaller pinion 159$^c$ meshing with a larger pinion 159$^d$ secured to the side face of the cam.

The cam groove is so formed that the gear wheels 150 and 151 will both be out of engagement with the teeth on the strips while they are being fed between the guide plates, and when they have come to rest therein, the cam acts to quickly shift one gear wheel (150 or 151) into mesh with the teeth on the adjacent strip B within the guides 144 and 144$^a$, (the gear wheel not engaged meanwhile rotating idly) and then remain in engagement until the particular strip has been fed through, after which the frame is operated to bring about similar engagement with the strip B on the opposite side. The gear wheels 150 and 151 are thus both rotated to alternately engage and feed the strips singly out of the guide strips at twice the speed at which they are fed in pairs between such strips.

To effect rotation of the gear wheels 150 and 151 the shafts to which they are secured are respectively equipped at their upper ends with pinions 150$^a$ and 151$^a$, meshing with each other, and the rearmost pinion 151$^a$ is arranged to mesh with a pinion 161 rotatably mounted on the upper end of the pivot bolt 153 on which the oscillating frame 152 is mounted,—see Figs. 1 and 5. The connections by which the pinion 161 is continuously driven will later be described.

As the strips B leave the front end of the guide plates they are engaged by a pair of horizontally disposed spring-pressed friction rollers 162—162$^a$ (see Figs. 5, 17 and 26), the rear roller 162$^a$, being fixed to a short vertical shaft journaled in bearings formed in the frame bracket 154 before referred to, and the front roller 162, being mounted in a pivoted frame 163 which by a spring 164 and adjusting bolt 165 may be tensioned to engage the roller 162 as desired. To the upper end of the shaft carrying the rear roller 162$^a$ is secured a pinion 166 meshing with a pinion 167 secured to the shaft carrying the roller 162.

The pinion 166 also meshes with the pinion 161, above referred to, to drive the gear wheels mounted on the oscillating frame 152, and both trains of mechanism are driven (see Figs. 17 and 26; also Fig. 5) by a pair of bevel pinions 168 and 169, secured respectively to the shaft carrying the pinion 166 and a horizontal rearwardly extending shaft 170, the rear end of which is equipped with a sprocket wheel 170$^a$ which is connected by a sprocket chain 430 with a driving shaft 429 mounted in the turret frame of the machine, as will later be explained.

Upon passing from between the friction rollers 162 and 162$^a$, the strip enters the rear end of a front guide plate 171 vertically grooved on its top to receive it, and passes beneath a toothed feed roller 172 mounted (in a manner described below) on a horizontal shaft to which is secured a pinion 173 journaled in a frame 174 pivoted on a horizontal axis on a frame bracket,—see Figs. 5, 17 and 18. The pinion 173 meshes with a pinion 175, pivoted on the bracket coaxially with the axis of the pivoted frame, and the pinion 175 is driven by a sprocket wheel engaged by a sprocket chain 176 engaging a sprocket wheel secured to the shaft 170 before mentioned,—see Figs. 1, 5, 17, 18 and 26. The pivoted frame is adjustably tensioned by a bolt and spring 177 to give a proper degree of spring pressure of the feed roller 172 upon the strip which it engages.

To permit the feed roller 172 to automatically adjust itself to accurate intermeshing of its teeth with the toothed strips, the roller is rotatably mounted on a cylindrical block 172$^a$ secured to its shaft, a side wall of the roller being formed with an arcuate slot through which a pin 172$^b$ on the block 172$^a$ extends, (see Fig. 18) thus providing a sufficient degree of lost motion between the parts to provide for self-adjusting engagement.

Reversing drum construction

From the groove on the forward guide plate 171, the strips are successively advanced by the roller 172 into the uppermost one of a series of longitudinally extending radial slots formed in the periphery of an intermittently rotated cylindrical reversing drum 180 journaled in bearings carried by the stationary frame of the machine. As the drum rotates and the slot openings containing strips with their teeth uppermost pass through a horizontal plane and finally pass to lowermost position with their teeth lowermost, the strips are prevented from falling out by forward and rear semi-circular guards 181—181ª. At the forward end of the drum an end guard 182 is provided, and a resilient guard strip 183 connected to the rear semi-circular guard 181ª and exerting a slight spring pressure on the strip in the uppermost slot, and a forward upper guard strip 184 connecting the guard strips 181 and 182 are also provided,—see Figs. 1, 5, 17 and 26.

To provide for intermittently driving the drum 180, a band of gear teeth 180ª are cut in its outer face arranged to mesh with the teeth of an intermediate gear 185 which also mesh with a pinion 186 secured to a shaft 187 to which is also secured the stop disk member 188 of an intermittent gear movement,—see Figs. 17 and 27. This disk member is formed with diametric cross-grooves 188ª arranged to cooperate with a driving roller 189 carried by a rotating arm 190, secured to the shaft 160 hereinbefore mentioned, the arrangement being such that the roller while in engagement with one groove will turn the disk one-fourth of a revolution. To the shaft 160 is also secured a mutilated locking disk 191, the incomplete cylindrical face of which is arranged to stop against the reentrant cylindrical face formed in the stop disk member 188 during the intervals when the driving roller is disengaged from the grooves of such stop disk member.

Below the drum 180 is arranged a reciprocating ejector bar 192 slidingly mounted in a way formed in the frame of the machine, and to the top of the bar is secured a pusher plate 193 arranged to contact the projecting portion of the metal strip in the lowermost slot of the drum (see Figs. 26 and 18), and eject it towards the left into position to be acted upon by the bending mechanism at the first work station of the bending and assembling mechanism later to be described.

The lower side of the ejector bar 192 is formed with ears, to which is pivoted a connecting rod 194 having a safety spring connection with a rocking actuating lever 195 pivoted to a portion of the turret frame, later to be described, and oscillated through an adjustable pitman rod 196 pivoted to a crank 197 secured to a short intermediate shaft 429 which is journaled in said turret frame near the rear thereof (see Figs. 5 and 37), and which will again be referred to.

*Bending and assembling portion of the machine*

Before describing in detail the bending and assembling mechanisms which for convenience may be referred to as the "turret" section or portion of the machine, and supplementing the explanation heretofore made, it may be stated that these instrumentalities are supported in a stationary metal frame (see Fig. 61) including a base casting 200; a pair of leg castings 201—201; a center casting having a horizontal flanged rectangular portion 202 integral with a tubular bearing portion 203 and a notched horizontal top portion 204, the portion 202 being formed with eight openings 205 in vertical alignment with the eight notches of the portion 204 to accommodate the die posts of the upper and lower dies at the eight work stations of the machine; a pair of frame posts 206—206 rigidly secured to the center casting; a cross-head 207 connecting the frame posts, and four vertical guide rods, all marked 208, which at the top are fixed to the central casting and at the bottom to bracket blocks forming a part of the opposite leg castings. The framework also includes various bearing or supporting brackets secured to the base casting, or other stationary parts of the frame mentioned.

The lower dies, at the second, third and fourth work stations of the turret portion of the machine are carried by an inner lifting frame guided by the two inner guide rods 208 of the stationary frame, while the lower dies at the sixth and seventh work stations and the like lifting member at the eighth work station are carried by an outer lifting frame at the outer or left side of the turret section which is a counterpart of the inner lifting frame. The outer frame is illustrated in Fig. 62, by reference to which it will be seen that such frame is a casting 209 formed with cylindrical die posts 210 to receive the die members; tubular guide blocks 211 to engage the guide rods 208, and a pair of ears 212 at each end between which are pivoted vertical lifting posts 213 by means of which the frame is lifted and lowered, as later described.

The upper die elements at the second, third, fourth, fifth, sixth and seventh work stations,—there being no upper die at the eighth station,—are carried by and move in unison with a die frame head (see Fig. 63), which consists of a casting formed with a cylindrical center portion 214 integral with radial flanges and a set of circumferentially arranged hubs, all marked 215, the hubs at the second, third, fourth, fifth, sixth and seventh work stations being arranged to receive the upper die elements. The upper die element at the first work station is slidingly guided in the hub aligned with the dies at that station but is given an independent movement. As before stated there is no upper die element at the eighth station.

Opposite the third and seventh work stations, the radial flanges of the head are extended and merge into two opposite tubular hubs 216—216 which slidingly engage and are guided by the frame posts 206.

The cylindrical center portion of the die head is machined to have an accurately sliding fit with the central bearing sleeve 217 of an intermittently rotated carrier table, or turret, 218, which latter is formed with openings 218ª, lined with hardened bushings arranged to support the bent sheet metal strips which are shifted by the table successively into alignment with the upper and lower dies at successive work stations. This carrier table is supported by the flat upper surface of the notched portion 204 of the stationary frame, the table thus remaining at a constant level and being maintained in accurate alignment with the die head by the sleeved connection described. To the lower end of the sleeve of the table is secured a Geneva disk 219 by which the table is given a step-by-step movement, as will later be more fully explained.

It may here further be explained that most of the moving parts of this portion of the machine are actuated by three parallel cam shafts which extend transversely of the machine and are all journaled in parts of the machine frame near the level of the center of the leg members. Of these, the center shaft, marked 220, which is the primary driving shaft, is journaled in a central pedestal 200ª, secured to the base casting 200,—see Figs. 35 and 36. This shaft (see Figs. 33, 35 and 37) is connected by a flexible coupling 221 with the shaft 80 hereinbefore mentioned, of which it forms an extension (see Figs. 1 and 37).

and has secured to it a gear wheel 222, meshing with a gear wheel 223 fixed to the front cam shaft 224, and also with a gear wheel 225 secured to the rear cam shaft 226. The shafts 222 and 224 are journaled in bearings in the leg members of the frame,—see Figs. 35 and 61.

The two lifting posts 213 by which the outer or left side lifting frame 209 is raised and lowered are connected by eccentric straps 213ª with a pair of eccentric blocks, one, marked 224ª, secured to the front cam shaft 224 and the other, marked 226ª, secured to the rear cam shaft 226. Similarly, the two lifting posts 213 by which the inner frame 209 is raised and lowered are connected with eccentric blocks 224ᵇ and 226ᵇ, respectively, on said front and rear cam shafts.

The die head which carries the upper die elements is raised and lowered by means of an eccentric 220ª fixed to the center shaft 220, and connected by a pitman 220ᵇ (which extends upwardly into the cylindrical center portion of the die head casting) with a transverse pivot pin 220ᶜ mounted in a pair of bosses formed at opposite sides of said center portion of the die head.

The Geneva movement by which the table 218 is given a step-by-step movement may also conveniently be here explained, see Figs. 35, 37, 38 and 63. To the rear cam shaft 226 is fixed a bevel gear 283 which meshes with a bevel gear 284 fixed to a short vertical shaft 285 journaled in bearings carried by the outer leg casting. The upper end of this shaft carries, in the plane of the Geneva disk 219, an actuating arm 286 equipped with a roller 287 arranged to successively engage radial grooves 288 formed on the under side of said Geneva disk. The shaft 285 also carries a locking disk 289 arranged to make locking engagement with peripheral arcuate notches 290 on the disk 219, to lock said disk and the carrier table in fixed position between its periods of movement.

Before proceeding to describe in detail the mechanism in the turret section or portion of the machine, certain actuating connections which have been referred to for driving the strip-separating and transfer connections already described may here conveniently be explained.

Secured to an inward extension of the rear cam shaft 226 is a sprocket wheel 420 engaging a sprocket chain 421 which also engages a sprocket wheel 422 secured to a short intermediate shaft 423 journaled in the machine frame,—see Fig. 37. To the outer end of this shaft 423 is secured a sprocket wheel 424 engaging a sprocket chain 425 which also (see Figs. 38 and 17) engages a sprocket wheel 426 secured to the shaft 160 through which the reversing drum is intermittently actuated, and the strip-feeding pinions are oscillated into alternate engagement and disengagement with the straight metal strips B, as well as through which mechanisms yet to be described are actuated.

To the outer end of the shaft 423 is secured a bevel gear 427 meshing with a bevel gear 428 fixed to a transverse short intermediate shaft 429 to which near its rear end are secured two sprocket wheels. The forward sprocket wheel, through a sprocket chain 430 and a sprocket wheel fixed to the shaft 170 (see Figs. 38, 26 and 5) drives said shaft and through it actuates the friction rollers 162—162ª, and the oscillating strip-feed pinions 150ª and 151ª and also actuates the toothed feed pinion 172.

The rear sprocket wheel engages the sprocket chain 145ᶜ, hereinbefore mentioned, to drive the interconnected driving pinions of the separating rollers 141—141ª, 142—142ª, and 143—143ª, as hereinbefore described.

To the short intermediate shaft 429 is also secured the crank 197 before mentioned through which the reciprocating bar 192 for ejecting the metal strips from the reversing drum is actuated.

The mechanical instrumentalities supported by the frame of the turret section of the machine, and by means of which the metal strips B are bent into circular form and united with the paper disks to form can ends may now be described in detail.

Bending mechanism at the first work station

As the straight strips B are successively ejected by the pusher plate 193 from the reversing drum they pass into a guideway formed in a stationary guide block 227 lying adjacent the rear of the first work station,—see Figs. 29, 31, 32ª and 32ᵇ. The inner part of the forward edge of this block is straight, and undercut to form the top and rear side of the guideway, while the outer part, or the part to the left as viewed in Figs. 29 and 32ª, is curved and formed with an undercut guide recess terminating in a shoulder or abutment 227ª at the end,—see Fig. 32ᵇ.

Forwardly of the straight-edged portion of the block 227 is arranged a movable guide block 228 secured to a pair of lifting pins 229 slidably mounted in a stationary guide block 230 carried by the frame of the machine. This movable block 228 is formed with a rectangular upper portion 228ª overlying a portion of the stationary block 227, in front of which is a depending intermediate portion 228ᵇ connected at the bottom to a horizontal lower portion 228ᶜ,—see Figs. 29 and 31,—and the lower ends of the two posts 229 slidingly engage orifices formed in the stationary guide block. When the toothed metal strip is forced into the undercut recess in the stationary block while the movable block is lowered, the latter block forms a part of the guideway for the strip in the zone of its upper uncut portion,— see Fig. 31.

The posts 229 and connected movable guide block are stressed by compression springs 231 on the posts upwardly, and act at proper intervals to lift the block from the position shown in Fig. 31 a sufficient distance to clear the metal strip and permit it to be bent by other elements. This lifting action is brought about through a train of connections including a cam 232 on the shaft 160 hereinbefore mentioned; a rock arm 233 equipped with a cam roller engaging the peripheral cam face of the cam 232; a rock shaft 234 to which said rock arm is secured, a second rock arm 235 secured to said shaft, and a link 236 pivoted to said last mentioned rock arm and pivot lugs on said block 228,— see Figs. 1, 17, 31 and 35.

Clamping bar

The straight strips B ejected from the reversing drum by the pusher plate 193 successively come to rest with the center of the particular strip standing opposite the axis of the dies at the first work station in position to be clamped by a sliding clamping bar 237 against the central element of the lower die while it is in raised position, — see Figs. 29 and 44, — and then bent by the action of an outer diagonally disposed bending slide 238, acting upon the outer or left curved half of the strip; a similar inner diagonally disposed bending slide 239 acting upon the inner half of the strip; and a center bending slide 240 acting upon the ends of the strip following the action of the diagonal slides; all slidingly mounted in guideways formed in a frame casting 241 secured to the horizontal portion 202 of the main center casting. The clamping bar is formed with a rearwardly extending straight portion 237 and an offset forwardly extending narrower clamping portion 237ᵃ which contacts the upper uncut zone of the strip just above the plane of the curved working sections of the diagonal slides shortly to be described. The rear end of the clamping bar is slotted and provided with a cross pin engaging a slot formed in the lower end of a rock arm 400 fixed to a short rock shaft 401 journaled in bearings on the frame of the machine (see Figs. 1, 33 and 28). The shaft also carries an arm 402 tensioned by a spring 403 which tends to stress the clamping bar forwardly into clamping engagement. The right or inner end of the shaft 401 is further provided with an arm 404 carrying a cam roller arranged to cooperate with the peripheral cam face of a rotating cam 405 secured to the shaft 160 earlier mentioned, see Fig. 17. By means of this cam the clamping bar is retracted against spring pressure at the proper time to release the strip from clamped engagement.

Diagonal slides

The diagonal slides 238 and 239 are counterparts of each other and, as shown in Fig. 30, have each a forward thin curved working section formed to contact the lower or toothed zone of the metal strip and a thicker rear portion formed with racks on the proximate sides of the two slides to provide for their actuation.

These slides 238 and 239 are simultaneously actuated (see Figs. 33, 28 and 29) by means of a cam disk 242 which is fixed to the outer or left end of the front cam shaft 224 and is formed with a side groove engaged by a cam roller 243 pivoted to the lower end of a vertical slide 244 guided in a guideway formed in the outer leg member 201 and formed with a rack on its forward side; a toothed segment 245 rotatably mounted upon a shaft 246, — which will later be referred to again; a rock arm 247 fixed to the hub of said segment; a connecting rod 248, extending to the rear side of the machine; a rock arm 249 secured to a rock shaft 250 journaled in a frame bracket 251 extending rearwardly from the frame; a rock arm 252 on said shaft on the inner end of said shaft; a pair of links 253—253 pivotally connecting the upper end of said rock arm with a pair of horizontal rack bars 254—254 slidingly mounted in the frame casting 241 secured to the horizontal rectangular portion 202 of the frame of the machine, and a pair of pinions 255—255, pivoted in said frame on vertical axes and meshing severally with said racks 254 and the racks on the diagonal slides.

Center bending slide

The center bending slide 240 (see Figs. 28, 32, 43 and 44) has a relatively wide rear portion slidingly mounted above the clamping bar 237 in the frame casting 241 and has formed upon its upper side a rack 240ᵃ by means of which it is reciprocated. The forward end of the bar is cut out centrally and forms a semi-circular downwardly extending portion 240ᵇ having an arcuate inwardly extending integral working section 240ᶜ which lies in the same horizontal plane as the toothed lower portion of the metal strip to be bent. At the inner side of the section 240ᵇ is a spring-pressed rocking block 256 which is pivoted in a recess in the slide, the inner face of which block, when the block is in inner position, is a continuation of the arcuate working face of the section 240ᶜ, as shown in Fig. 29, but which is stressed by its spring to the position shown in Fig. 28, in which latter position it directs the inner end of the strip being bent radially inward with respect to the other end of the strip, so as to cause a slight overlapping of the ends.

The center bending slide is actuated (see Figs. 33, 36, 28, 32 and 35) by means of a cam disk 257 secured to the center cam shaft 220 near its outer end and formed with a side groove engaged by a cam roller 258 carried by the upper end of a bell-crank lever 259 which is pivoted on the frame of the machine and at its rear end is pivotally connected with a vertical connecting rod 260 yieldingly connected (as a safety measure, in case of jamming of the parts) with the end of a rock arm 261 on the left or outer end of a rock shaft 262 which is journaled in bearing posts 263—263 on the frame of the machine and which carries a gear segment 264 arranged to mesh with the rack 240ᵃ of the slide.

The bending dies at the first work station

The die post 264 to which is secured the upper die 265 at the first work station (see Figs. 35, 43, 44 and 45) is slidingly mounted for independent actuation in the associated hub 215 of the die head before mentioned. Slidingly mounted within a hardened ring 265ᵃ which is secured to and in effect constitutes a part of the die member 265 is a spring-pressed die element 266 to which is secured a post 266ᵃ which permits a slight yielding relative movement between the upper and lower die elements. The lower, or working face of the die element 266 is formed with a peripheral rounded groove 266ᵇ, as illustrated in Figs. 43, 44 and 45.

The lower die 267 is also mounted for independent actuation upon a die post 268 which is slidingly mounted in a hub on the under side of the horizontal portion 202 of the main frame, and the member 267 is also provided with a hardened ring, marked 267ᵃ, which is counterbored to provide a recess of proper size to receive the lower toothed portion of the rings bent by the bending mechanism above described to form such rings. Within the hardened ring 267ᵃ the die member 267 carries a spring-stressed inner die element 267ᵇ of such size as to enter the inside of the rings, and to which are secured headed posts 267ᶜ permitting a yielding relative movement between the parts so connected.

The upper die at this first work station is given the movements which occur during a cycle of operation (see Figs. 33, 36, 35) by a cam disk 269 fixed to the rear cam shaft 226 and formed with a side groove engaged by a cam roller 270 pivoted to the lower end of a sliding bar 271 working in a guideway formed in the left-hand leg member 201 of the frame. To the upper end of this sliding bar is pivoted a vertical connecting rod 272 yieldingly connected (as a safety measure) to a connecting block 272ᵃ pivoted to a rock arm 273 carried by the outer end of a rock shaft 274 journaled in bearings carried by the cross-head 207 of the frame. To the inner end of this shaft 274 is fixed a rock arm 275 which by a link 276 is pivotally connected with the upper die post 264.

The lower die at the same station is given its vertical reciprocating movement through a cam disk 277, secured to the rear cam shaft 226 near its inner or right end,—see Figs. 34, 37, 35, 38. This cam disk is formed with a side groove engaged by a cam roller on the lower end of a vertical reciprocating bar 278 slidingly mounted in a slideway in the rear leg member 201 of the frame. The upper end of this bar is formed with a transverse slot to engage a sliding block pivotally mounted upon the end of a short rock arm 279 fixed to a rock shaft 280 journaled in bearings carried by the opposite leg members 201. A rock arm 281 is secured to this shaft near its center which is forked at its end and equipped with a pair of pivoted blocks 282—282 arranged to engage opposite cross channels or slots formed in the lower end of the die post 268 supporting the lower die elements.

It may now be explained that each toothed straight metal strip B ejected from the reversing drum by the pusher plate 193 is fed between the stationary guide block 227 and the movable guide block 228 while the upper and lower dies are in separated position. The lower die member is then lifted and immediately thereafter the sliding clamping bar 237 moves forwardly to clamp the upper uncut zone of the strip against the lower die element 267b. Then the movable guide block is lifted to clear the strip and the diagonal bending slides simultaneously act to partly curve the opposite ends of the strip around the lower die, and immediately following this the center bending slide shifts rearwardly to complete the bending of the strip to circular form with the ends of the strip overlapping each other. The upper die is then lowered slightly and the toothed lower edge of the bent strip enters the aligned opening in the rotating carrier table 218, and the bending slides and clamping bar are then retracted. The upper die then moves further down and pushes the bent strip fully into the seat between the lower die element 264 and the counterbored element 267a, while the curved face 266b of the lower element of the upper die forms an outwardly curved flange on the upper uncut edge of the bent strip and the overlapping ends are brought into abutting relation. During the bending of this flange the lower edge of the hardened ring 265a of the upper die is forced downwardly against spring tension so that it forms a projecting ledge to define the outer edge of the flange on the strip. After the bending is completed the upper and lower dies move oppositely from the plane of the table, leaving the bent strip therein so that it may be shifted to the second work station.

*Mounting of die blocks at second, third and fourth work stations*

At the second, third and fourth work stations, the upper die blocks are rigidly secured on the radially disposed hubs 215 of the vertically reciprocating die head casting. In the present instance (see Figs. 36, 46, 48 and 50), each die block is secured to its particular hub and centered therein by means of a bolt 291 screw-threaded in the die block and serving to clamp the block through a lower clamping block 292 and upper clamping block 293 to a sleeve 294 which is exteriorly threaded at its opposite ends and is clamped in turn within the bore of the hub by upper and lower clamping nuts 295.

At the same stations the lower die blocks are secured directly to the die posts 210 of the inner lifting frame by means of screw bolts 210a,—see Figs. 36, 46, 48 and 50.

*Second work station*

The upper die block, 296, at the second work station (see Figs. 46 and 47) is telescopically connected with a central die member 297 by means of a headed bolt 298 permitting limited relative movement between the connected parts, and a compression spring 299 serves to stress the connected members apart. Telescopically mounted on the die block is an intermediate die member 300 which in turn telescopically engages an outer die member 301, the intermediate and outer die members being stressed apart by compression springs 302 engaging the intermediate die-member and an abutment block 303, and compression springs 304 between such compression block and the outer die member. Headed bolts 305 permit a limited relative movement between the intermediate die member and the abutment block, and headed bolts 306 permit limited relative movement between the outer die member and abutment block.

The lower die block, 307, at the second work station is slidingly engaged by an outer die member 308 which is counterbored and connected with a shouldered inner die member 309 by pin 310, the counterbore of the member 308 being of larger diameter than the shouldered top of the member 309 to provide a recess between them to receive the toothed lower portion of the bent strip. Headed bolts 311 permit limited relative movement between the lower and inner die member 307 and the outer die member 308, which are stressed apart by compression springs 312 between the die block 307 and said outer die member, and also by springs 313 between said die block and said inner die member 309.

At each cycle of operation of the die member just described, the ascending lower die members rise to the position shown in Fig. 47 in contact with the carrier table, while the descending upper dies descend to the position there shown, and in so doing bend the upper uncut portion to flatten the flared portion above the level of the table and thus form a right angled flange, the inner upper die member yielding until the die block 296 brings up against it and the die block and inner members then being forced down together while the intermediate die member further yields until the compression block brings up against it, after which the inner and intermediate blocks are forced downward together. During these movements, the outer upper die member 301 at all times remains below the level of the lower face of the intermediate die member, in position to act as a stop to define the outer edge of the bent strip.

It may be noted that the hardened bushing of the carrier table in which the bent strip is carried is in effect the lower working member, the lower die members 308 and 309 merely receiving the toothed edge of the bent strip and providing a backing for the carrier table.

*Third work station*

At the third work station the teeth of the ring are bent inwardly at an angle to the position shown in Fig. 49. The upper die block, marked 314, is formed with a cylindrical bore to receive an inner upper die member 315, stressed by compression springs 318a, which carries a headed bolt 316 permitting limited movement between such head and die member. Slidingly surrounding said central die member is an outer die member 317 having a shouldered engagement permitting limited relative movement between said inner and outer members, while a headed bolt 318 permits limited movement between said outer member and the die block. Compression springs 319 between said die block and outer die member 317 serve to stress the parts to the position shown in Fig. 48.

The lower die member, 319b, formed with an inclined working face is secured in a shouldered seat formed on the lower die block 319c. At each cycle of operation the upper die member 317 first acts to clamp the top flange of the bent strip on the table and upon further descent of the die head the inner upper die member 315 enters the upper part of the ring to confine and support it, while the ascending lower die acts to bend the toothed portion of the strip, and when the dies separate, the outer member of the upper die acts as a stripper while the inner member ascends.

*Fourth work station*

At the fourth work station the teeth are bent from the position shown in Fig. 49 to the position shown in Fig. 51. To this end the upper die block 320 is formed to make telescopic engagement with an inner die member 321, the parts being stressed apart by compression springs 322 and permitted limited relative movement by contact shoulders on the two die elements; and the inner die member is slidingly engaged by an outer die member 323 which likewise is stressed by compression springs 324 and is permitted limited relative movement by headed bolts 325. The abutment block 292ª illustrated in Fig. 50 functionally constitutes a part of the clamping block 292 and die block 320.

The lower die block 326 is also formed to make sliding telescopic engagement with an outer die member 327, the parts being stressed apart by compression springs 328 and permitted limited relative movement by headed bolts 329.

It will readily be understood that as the upper and lower die parts approach each other, the upper die element 323 will yieldingly clamp the bent strip to the carrier table, which will be supported by the yielding outer lower die member 327, and that at the final movement of the parts the strip will be pressed by the lower die member 327 and upper die members 321, and 320, acting in the order mentioned, to take the form shown in Fig. 51.

*Fifth work station*

At the fifth work station the fibre disks, marked 330, are succesively fed from a stock of disks to a position below and in axial alignment with the bent strips on the carrier table, and the disks are then lifted against the downwardly pointed ends of the teeth, forcing the teeth of each strip through the particular disk presented to it,—see Figs. 52, 53, 54 and 55.

As illustrated in Fig. 53, the upper block 331 seated in the clamping block 292 at the fifth work station is equipped with a hardened ring 332, within which is slidingly mounted the upper pressure member 333, which is stressed by a spring 334 and permitted limited relative movement with the member 333 by a headed bolt 335.

The disk-lifting members at the fifth work station are mounted for independent actuation upon a lifting post 336, slidably mounted in vertical hubs formed on the horizontal portion 202 of the frame of the machine, and include a central block 337 and an abutment block or disk 338, both secured to said post. The block 337 is also provided with a ring member 339 around its upper portion, which in effect constitutes a part of it, and below the top face of the block and ring the block is formed with an annular channel 340 which is open between said members and with inclined grooves 341 communicating with a dust-collecting chamber 342 in said block. Surrounding the block 337 is arranged a pressure ring 343 formed with a bottom flange connected by bolts 344 and stressed away from it by compression springs 345. Above the plane of the upper faces of the block 337 and ring 339, the upper front portion of the pressure ring 343 is cut away to permit introduction of the paper disks and avoid interference with a sliding bar 346 and pusher plate 347, which will both be referred to again, and at diametrically opposite points the ring 343 is equipped with spring-pressed plungers 348 (see Figs. 52 and 55) in proper position to engage and retain in position the paper disks delivered by the pusher plate to a position within the confines of said ring.

The lifting post 336 at the fifth work station is raised and lowered (see Figs. 34, 35 and 37) through a cam disk 379 secured to the front cam shaft 224 near its inner end and formed with a side groove engaged by a cam roller 380 carried by the lower end of vertical slide bar 381 sliding in ways formed on the inner leg member 201 of the frame. The upper end of this slide bar is formed with a transverse slot engaged by a sliding block pivoted to the end of a rock arm 382 fixed to the rock shaft 246 which extends across the front of the machine and has before been referred to. Opposite the fifth work station this rock shaft 246 carries a rock arm 383, the inner end of which is forked to provide pivot bearings for a pair of slide blocks 384—384 which engage a pair of opposite cross slots in the lifting post 336.

*Disk feeding mechanism*

The stack of paper disks and mechanism for feeding them at the fifth work station are supported by a frame bracket 349 secured to the main frame 202 of the machine,—see Figs. 33, 35 and 39. Slidingly supported in said bracket between two plates 350—350 which form a feed table for the fibre disks is the sliding bar 346, above referred to, which at the rear end of its upper side is provided with the pusher plate 347, of the same thickness as the disks. Above the plates 350 and secured to the frame work is the orificed magazine base 353 which is channeled on its lower face to accommodate the pusher plate 347 and provided with vertical rods 354, in the present instance four in number, to receive the stack of disks.

While the lowermost disk is being removed from the stack of disks, the disks above it are supported by the pusher plate until upon its return movement it clears the zone of the stack whereupon the stack lowers and comes to rest upon the side plates 350—350, in position for the next disk in the stack to be removed by the next forward stroke of the slide bar and pusher plate.

*Connections for operating disk feed*

The train of connections between the slide bar 346 and the center cam shaft 220 through which it is operated are dependent upon and controlled by the edge of the bent strips as they move from the fourth work station to the fifth station, the arrangement being such that if there is no strip in the carrier table, no feeding movement of the slide bar and pusher plate will occur. These connections include (see Figs. 34, 35, 39, 40, 41 and 42) a cam disk 355 on the center cam shaft 220 near its inner end formed with a cam groove in its side face arranged to coperate with a cam roller carried by a rocking lever 356 fixed to a rock shaft 357 which is journaled upon bearings carried by the frame of the machine and to which is also secured a rock arm 358. This rock arm is pivotally connected with a connecting rod 359 yieldingly connected by a sliding connection and spring 360 with an upper connecting rod section 359ᵃ with a rock arm 361 carried by a hub 361ᵃ loosely pivoted upon a shaft 362 rotatably mounted on bearings on the frame bracket 349. The shaft 362 is equipped with a brake 363 to yieldingly steady and hold it in its different positions except when positively moved by its actuating connections.

To the shaft 362 is secured a rock arm 364 which is connected by a link 365 with ears secured to the lower side of the slide bar 346.

From the description above given it is obvious that the lever 361 will be rocked so long as the cam shaft 220 of the machine continues to rotate, and that when the hub 361ᵃ of the lever is connected to the shaft 362—through means next to be described—the slide bar and pusher plate will be reciprocated to feed disks to the lifting members below the carrier table at the fifth work station.

Adjacent the hub 361ᵃ of the rock arm 361, (see Figs. 39, 40, 41 and 42) there is secured to the shaft 362 the hub of a short arm 366 in which at its outer end is rotatably mounted a short pivot pin 367 to which is secured a pawl 368 arranged to cooperate with a ratchet tooth 369 formed on the hub 361ᵃ of the rock arm 361. Also secured to the pivot pin 367 is a rock arm 370 which is connected by a link 371 with a rock arm 372 secured to the lower end of a short vertical rock shaft 373 journaled in bearing lugs formed on the frame bracket 349. To the upper end of said rock shaft is secured a rock arm 374 which is connected by a link 375 to a rock arm 376 carried by a hub which is pivoted in a bearing carried by the frame section 202 and to which is also secured a thin rocking plate 377, the edge of which projects into the path of the outer edge of the bent strips supported by the carrier table as they are shifted from the fourth to the fifth work station. A compression spring 377ᵃ, confined between the rocking plate 377 and a bracket piece on the frame bracket serves to press the plate into close yielding contact with the top face of the carrier table, so that it may accurately engage the edges of the bent strips. A spring 378 connected at its ends to the frame bracket and the pivot of the joint between the link 375 and the rock arm 376 serves to stress the connected parts in a direction to maintain the pawl 368 in elevated condition, out of engagement with the ratchet tooth 369. When a bent strip in the carrier table, however, is passing from the fourth to the fifth work station, its edge will rock the arm 377 and connected parts against the tension of the spring 378 and bring about engagement of the pawl and ratchet tooth and connect the rock arm 361 to the shaft 362, thus establishing operative connection to cause reciprocation of the slide bar and pusher plate.

To provide for accurate adjustment of the pawl with respect to the ratchet tooth, the hub 361ᵃ of the arm 361 is equipped with an adjusting screw 361ᵇ adapted to cooperate with a stop lug 366ᵃ formed on the hub of the arm 366.

Operation of parts at fifth work station

As will readily be understood from the foregoing description and by reference to Figs. 53 and 54, after the carrier table has come to rest with a bent strip thereon in alignment with the upper and lower clamping block and lifting members described, the slide bar and pusher plate are reciprocated to impose a disk upon the top of the central lifting block and the upper and lower members carried by the upper post 292 and lower post 336 are shifted towards each other. First, the upper pressure member enters within the line of the downwardly bent portion of the tips of the teeth of the rings, and the ring portion of the pressure member then bring up firmly against the outer portion of the strip on the carrier table. Meanwhile, the ascending lifting members below rise to force the disk against the teeth of the strip (the member 333 yielding at the time) and the parts assume the position shown in Fig. 54, such shreds of paper as are severed passing downwardly through the passages above described into the collecting chamber 342 in the lower block, and the parts 333 and 343 acting to disengage the connected disk and bent strip from the reciprocating parts.

Sixth and seventh work stations

At the sixth and seventh work stations (see Figs. 56, 57, 58 and 59) the action of the dies is so simple as to require little explanation. At the sixth station the composite upper die element, marked 385 as a whole, cooperates with a lower die member 386 having a beveled outer working face to bend the tips of the teeth outwardly, as shown in Fig. 57; and at the seventh station the upper die member, similarly marked 387, cooperates with a lower die member 388 to clinch the tips of the teeth into the body of the disk.

Eighth work station

At the eighth work station, there is no upper vertically movable member and the lower member, 389 (see Fig. 60), serves to lift the completed end out of its seat in the carrier table, into position to be acted upon by an ejector mechanism, which will next be described.

To the outer or left end of the center cam shaft 220 is secured a cam disk 390 formed with a peripheral groove adapted to cooperate with a cam roller 391 carried by a rock arm 392 fixed to the lower end of a vertical rock shaft 393 (see Figs. 33 and 36), to the upper end of which is fixed a gear segment 394 arranged to mesh with a gear segment 395 carried by the lower end of a hub 395ᵃ loosely mounted on a short vertical stationary shaft 396, see Figs. 33, 28 and 36. To the top of the hub 395ᵃ is secured the ejector member 397 (see Figs. 28, 36 and 60) which, when reciprocated by the connections described, serves to sweep the completed can ends into a downwardly inclined discharge chute 398.

As a precaution to displacement of the bent strips in their travel on the carrier table between the second and sixth work stations, an arcuate inner guide strip 602 and an arcuate outer guide strip 603 are provided, both supported on the upper inwardly extending portions of bracket bars 604, which are fixed at their lower ends to the frame 202,—see Figs. 28 and 33.

Electrical protective devices

In addition to the yielding connection of certain reciprocating parts heretofore described for the purpose of preventing immediate damage in case of jamming of the material operated upon, I have provided, at points where damage is most apt to occur, electric switch mechanisms which are adapted to close an electrical circuit through a solenoid and energize it to thereby operate a clutch and disconnect the main power shaft 52 from the pulley 51 connected to the motor, thus stopping the machine,—see Figure 64, illustrating somewhat diagrammatically the various devices and connections.

To provide for these protective devices, the pulley 51 and the hollow main power shaft 52 are provided respectively with cooperating driving and driven clutch elements of any suitable construction, the driven elements being connected to a clutch rod 500 by which they may be shifted axially to opposite positions of engagement and disengagement. This clutch rod is shifted by a rock arm 501 fixed to a shaft 502 pivoted on the frame of the machine, which shaft may be rocked manually by a handle 503, if desired, and under abnormal conditions arising in the machine is arranged to be rocked by a rock arm 504 connected by a link 504ª to the core of the solenoid, marked 505. The winding of the solenoid is grounded at one end on the machine frame and at the other end is connected with one pole of a source of electric energy 506, the other pole of which is connected with normally open insulated switch elements in branch circuits, all marked 506ª, adapted to be closed under the abnormal conditions mentioned to complete the circuit through the machine frame and solenoid, thus energizing the solenoid and through the mechanical connections described shifting the clutch element to disconnect the main power shaft from the motor.

Referring in order to the various electrical protective devices provided, the first device is designed to stop the machine in case a connected double strip should jam in front of the yieldingly mounted push rod 46 provided for ejecting it laterally from beneath the cutting mechanism. To this end the spring barrel 48 with which the push rod is connected is provided with an insulated contact member 48ª which is arranged to make contact with the outer end of the rod in case of the jamming of the strip, and thus complete the circuit through the machine frame.

The second electrical protective device is designed to stop the machine in case no pair of connected metal strips is being ejected by the push rod 46 from a position in advance of the cutting dies to the first group of feed and separating rollers. To this end, immediately above the path of the strips, there is provided a weighted rod 507, the upper end of which slidingly engages a forked lever 508 intermediately pivoted to the machine frame and adapted to be rocked by a pivoted pawl 509 carried by the die head when the latter moves upwardly, the pawl rocking idly past the end of the lever in its downward movement. The inner end of the lever 508 is stressed by a spring to maintain the forked end and weighted rod 507 in a stopped upper position except while lever is being rocked by the pawl 509, which occurs at the period when a strip should be passing beneath the rod. If the feeding of the strips is uninterrupted, the strip underneath the contact member will block the rod and prevent its further downward movement, the fork at the end of the lever 508 being permitted to rock idly downward, but if no strip is underneath the rod 507, the rod will descend to a point where it will contact with an insulated switch member 510 on the machine frame, and complete the electrical circuit.

The third electrical protective device consists of an insulated branched contact member 511, adjacent the path of a strip passing between the upper rollers 141, 142 and 143, and lower rollers 141ª, 142ª and 143ª, in such position that in case one of the metal strips should join and buckle in the rollers it will make contact with such contact member to complete the circuit through the strip and frame of the machine.

The fourth protective device is designed to stop operation of the machine in case a metal strip is not delivered by the feed roller 172 to properly enter a radial slot in the reversing drum 180. In this event the strip, bringing up against the end of the drum, must buckle out of its proper path and into contact with an arcuate, insulated contact device 606 carried by frame members of the machine and arranged a slight distance from the end of the drum, thus completing the circuit through the strip.

The fifth protective device is designed to stop the machine in case a strip jams while being ejected from the reversing drum 180, and consists of an insulated contact member 195ª carried by the end of the rocking actuating lever 195 and arranged to contact the connecting rod 194 in case movement of the latter is prevented by a jammed strip, the spring connection of the rod with the lever in such case being compressed.

The sixth protective device is located at the second work station of the turret portion of the machine, and consists of an insulated arcuate switch member 605 arranged in advance of and slightly above the top edge of a bent strip properly seated in the rotating table, in such position as to make contact with such strip in event it should stick to the upper die member and be carried up or improperly seated, an occurrence which, because of the shape of the die members at this station, is more apt to take place here than at any of the other stations.

The seventh protective device acts to stop the machine in case a paper disk should jam while being fed into position between the upper and lower pressure members at the fifth work station of the turret portion of the machine. This protective device is somewhat similar in construction to the fifth protective device and consists of an insulated contact member 359ᵇ which is carried by the lower section of the connecting rod 359 and which, in case of jamming of a disk, brings up against a part of the upper portion of the rod 359ª to complete the circuit through the machine and solenoid.

The eighth protective device is designed to operate in case two or more of the completed can ends should not be properly discharged at the eighth work station and should pile up under the ejector member 397. In this case, the ejector member (the hub 395ª of which it will be remembered is loosely mounted on the short vertical shaft 396) is lifted on the shaft, bringing the face of the segment 395 fixed to the lower end of the hub into contact with an insulated contact member 397 to complete the circuit through the frame of the machine and solenoid.

In case a completed can end should remain in its seat in the carrier table and be carried past the eighth work station, I have also provided a ninth protective device for stopping the machine, which consists of a rocking lever 600, one end of which projects into the path of such a can end carried past, and the other end of which is equipped with a switch member arranged to make contact with an insulated switch member 601 and thus when the lever is rocked complete the electrical circuit.

I claim:

1. A machine for forming can ends comprising feeding mechanism arranged to intermittently feed sheet metal blanks, cutting mechanism arranged to sever from the blanks strips toothed on one edge, means for bending the strips into circular rings, means for flanging the bent rings opposite their teeth, means for feeding fibre disks into axial alignment with the rings, means for forcing the teeth of the rings through the disks, and means for clamping the teeth to the disks.

2. A machine for forming can ends comprising feeding mechanism arranged to intermittently feed sheet metal blanks, cutting mechanism arranged to sever from the blanks strips toothed on one edge, means for bending the strips into circular rings, means for flanging the bent rings opposite their teeth, means for bending the base portions of the teeth into a radial plane and the tips at right angles to the bases, means for feeding fibre disks into axial alignment with the rings, means for forcing the teeth of the rings through the disks, and means for clamping the teeth to the disks.

3. A machine for forming can ends comprising feeding mechanism arranged to feed sheet metal blanks, cutting mechanism arranged to sever from the blanks pairs of connected intermeshing toothed strips, means for separating the strips, means for bending the strips individually into circular rings, means for feeding fibre disks into axial alignment with the rings, means for forcing the teeth of the rings through the disks, and means for clamping the teeth to the disks.

4. A machine for forming can ends comprising feeding mechanism arranged to intermittently feed sheet metal blanks, a cutting press arranged to sever from the blanks pairs of connected intermeshing toothed strips, pairs of separating rollers arranged to separate the strips, a pair of oscillating toothed feed rollers arranged to alternately engage the teeth on the strips of each pair, means for advancing strips successively delivered by said feed rollers, means for bending the strips into circular rings, means for feeding fibre disks into axial alignment with the rings, means for forcing the teeth of the rings through the disks, and means for clamping the teeth to the disks.

5. A machine for forming can ends comprising feeding mechanism arranged to intermittently feed sheet metal blanks, a cutting press arranged to sever from the blank pairs of connected intermeshing toothed strips, pairs of continuously rotated separating feed rollers arranged to separate the strips and advance them, a guideway arranged to receive the strips delivered by the separating feed rollers, said separating rollers and guideway acting to bring the strips in approximate parallelism with their teeth uppermost, a pair of toothed feed pinions arranged to alternately engage the teeth of the strips in said guideway, an upper feed pinion in advance of said pair of feed pinions arranged to engage in succession the teeth of the strips delivered to it by said pair of toothed feed pinions, an intermittently rotated reversing drum formed with longitudinally extending radial slots arranged to receive in succession in the uppermost slot strips delivered by said upper feed pinion, ejecting means adjacent the bottom of said drum for ejecting the strips in their reversed position, means for bending the strips into circular rings, means for flanging the bent rims around the top, an intermittently rotated carrier table arranged to receive said flanged rings and support them at a plurality of work stations, die members for shaping said rings at certain of said work stations, means for feeding fibre disks into axial alignment with said rings at one work station, and means for forcing the teeth of the rings through the disks and for clamping the teeth to the disks at successive work stations.

6. In a machine of the character described and including a cutting press for intermittently cutting and advancing pairs of toothed, intermeshed, connected sheet metal strips and also including forming and assembling mechanism, separating and transfer mechanism including a group of continuously driven upper and lower separating rollers arranged to advance the pairs of strips intermittently delivered by the cutting press, certain of said rollers having faces oppositely inclined from a center line arranged to progressively twist the strips toward parallelism with their teeth uppermost, a guide block arranged to receive the separated pair of strips and bring them into substantial parallelism, a pair of continuously rotated feed pinions arranged to alternately engage the teeth of first one strip and then the other and advance them successively, a single continuously rotated feed pinion arranged to further advance said strips, an intermittently rotated reversing drum formed with longitudinal peripheral slots arranged to successively receive said strips in its uppermost slot, and an ejector bar arranged to eject strips from the lowermost slot to the forming and assembling mechanism.

7. In a machine of the character described and including a cutting press for intermittently cutting and advancing pairs of toothed, intermeshed, connected sheet metal strips and also including forming and assembling mechanism, separating and transfer mechanism including a group of continuously driven upper and lower separating rollers arranged to advance the pairs of strips intermittently delivered by the cutting press, certain of said rollers having faces oppositely inclined from a center line arranged to progressively twist the strips towards parallelism, a guide block arranged to receive the separated pair of strips and bring them into substantial parallelism, and means for alternately advancing said strips in succession to the forming and assembling mechanism.

8. In a machine of the character described and including means for cutting pairs of toothed, intermeshed, connected sheet metal strips, means for separating said strips including a plurality of upper and lower rollers having faces formed in succession at sharper angles to a central plane and arranged to progressively twist the strips toward parallelism.

9. In a machine of the character described and including means for cutting pairs of toothed, intermeshed, connected sheet metal strips, means for bringing the metal strips into approximate parallelism with each other, including a guide-block formed with opposite guide walls inclined from a greater angle at the entrance end of the block toward a lesser angle at the opposite end.

10. In a machine of the character described and including means for cutting pairs of toothed, intermeshed, connected sheet metal strips, means for bringing the metal strips into approximate parallelism with each other, including a guide-block formed with a center wall and opposite side walls forming a pair of guideways inclined from a greater angle at the entrance end of the block toward a lesser angle at the opposite end.

11. In a machine of the character described and including means for periodically advancing pairs of toothed sheet metal strips to a position of rest in a guideway with their teeth standing upward and parallel, means for feeding said strips in succession including an oscillating frame mounted on a vertical axis, a pair of driving pinions disposed in a horizontal plane mounted on vertical axes in said frame, one pinion being arranged to engage one of said strips in one extreme position of the frame and the other pinion being arranged to engage the other strip in the opposite extreme position and both pinions being disengaged in central neutral position, and means for shifting said frame and pinions to neutral position while a pair of strips are being advanced into said guideway and from one extreme position to the other between such advancement of the strips.

12. In a machine of the character described and including cutting mechanism for cutting pairs of toothed, intermeshed connected sheet metal strips and a push rod for advancing said pairs of strips, separating and feed mechanism including pairs of rollers arranged to receive the connected strips delivered by said push rod and separate them and advance them in pairs, a guide-block arranged to receive the separated pairs of strips, and feeding means for advancing said strips separately in succession for further operations.

13. In a machine of the character described and having a guideway for the advancement successively of toothed strips of metal, a spring-stressed shaft and a feed pinion on said shaft stressed by the spring edgewise toward said strip, said pinion having a lost-motion connection with said shaft to permit automatic meshing of the teeth on the pinion with the teeth on the strip.

14. In a machine of the character described, a reversing drum formed with peripheral longitudinally extending radial slots, means for intermittently rotating said drum to bring diametrically opposite slots to positions of rest at top and bottom in succession, means for feeding metal strips succesively into the uppermost slot, semi-circular guards to retain the strips in the slots from disengagement, and a reciprocating plunger member for ejecting the strips successively from the lowermost slot.

15. A reversing drum according to claim 14 in which said drum is formed with a belt of peripheral teeth and is rotated by a pinion meshing with said teeth.

16. In combination with means for feeding toothed sheet metal strips, forming and assembling mechanism including an intermittently movable carrier table formed with ring seats arranged to stop at successive work stations, means adjacent the first work station for bending the strips to form rings and also for positioning the rings in the successive ring seats, means at subsequent work stations for bending the teeth of the rings, means at a subsequent work station for feeding fiber disks into axial alignment with the rings, and means for subsequently forcing the teeth of the rings through the disks and clinching them thereto.

17. In combination with means for feeding toothed sheet metal strips, forming and assembling mechanism including an intermittently rotated carrier table formed with a circular row of seating orifices arranged to stop at successive work stations, means adjacent the first work station for bending the strips to form rings and for positioning the rings in the seating orifices and for flanging the rings, means at subsequent work stations for bending the teeth of the rings inwardly and downwardly, means at a subsequent work station for feeding fiber disks to the rings and forcing the teeth of the rings through the disks, and means at subsequent work stations for clinching the teeth to the disks.

18. In combination with means for feeding metal strips, means for bending said strip to form flanged circular rings including a mandrel arranged to be intermittently shifted axially into working position, a pair of reciprocating bending members having arcuate faces arranged to shift towards the axis of the mandrel when in said working position and bend the end portions of the strips partially around the mandrel, and a third reciprocating bending member having an arcuate face arranged to further bend the end of the strip completely around the mandrel, and an axially reciprocating die member arranged coaxially with said mandrel and cooperating therewith in said working position for flanging said completely bent strip.

19. In combination with means for feeding metal strips, forming mechanism including an intermittently movable carrier table formed with ring seats, a reciprocating mandrel in alignment with the successive ring seals, a pair of reciprocating bending members having arcuate faces arranged to shift towards the axis of the mandrel and bend the end portions of the strip partially therearound, a third reciprocating bending member having an arcuate face arranged to further completely bend the ends of the strip, and a reciprocating upper die member arranged to force said bent strip into the ring seat of the table and flange the upper edge of the strip outwardly past the edge of the ring seat.

20. Forming mechanism according to claim 19 in which the mandrel is of less diameter than the ring seat and the ends of the strip are bent by the forming member to overlap on the mandrel, and in which the upper die member is arranged to spread the ends of the ring into abutting relationship.

21. In a machine of the character described and having reciprocating bending members for bending metal strips into rings, means for feeding said strips to said bending means including a stationary guide block having a face forming the rear wall of a guideway for the strips, and a vertically movable guide block forming the front wall of the guideway, said movable guide block being arranged in the path of a reciprocating bending member and arranged to be intermittently lifted to clear said reciprocating member at the time of its movement.

22. In a machine of the character described, bending and forming mechanism comprising a rear stationary guide block, a movable forward guide block having a vertical reciprocating movement, a vertically reciprocating mandrel, a clamping bar, a pair of diagonally arranged reciprocating bending bars having arcuate working faces, a third reciprocating bending bar having at its front end an arcuate working face, an intermittently rotated carrier table formed with a series of ring seats, and upper reciprocating die members in axial alignment with said mandrel and said ring seats arranged to position the bent strips in said ring seats and flange their upper edges.

23. In a machine of the character described, a carrier table arranged to be intermittently rotated on a vertical axis and provided with ring seats adapted to stop at a series of work stations, means adjacent the first work station for positioning in said seats rings having curved top flanges and toothed bottom portions, die members at the second work station for squaring said curved flanges to produce a top flange lying in a horizontal plane, die members at the third station for bending the toothed lower portion of the ring inwardly upon a funnel shaped surface, and die members at the fourth work station for bending the zone of the base portion of the teeth into an intermediate horizontal plane and the tips of the teeth downwardly.

24. In a machine of the character described and having an intermittently rotated carrier table formed with ring seats arranged to successively present rings with downwardly bent teeth in succession to work stations, a lifting block below said table at one station formed to support fibre disks in axial alignment with the rings, means for intermittently feeding disks to said block, a die member above said table, and means for reciprocating said lifting block and die member to force the teeth of the rings through the disks.

25. In a machine of the character described, mechanism according to claim 24 in which said lifting block is recessed below said teeth and formed with a collecting chamber to receive fragments of fibre dislodged by the teeth of the ring.

26. In a machine of the character described, mechanism according to claim 24 in which said lifting block is provided with a spring-pressed telescopically-connected member formed with a semi-circular flange arranged to position the disks fed to said block.

27. In a machine of the character described and having an intermittently rotated carrier table formed with ring seats arranged to successively present flanged rings in said seats in succession at a work station, a reciprocating slide for feeding disks into said rings, a train of connections for actuating said slide including an oscillatory contact member in the path of travel of the flange of a ring in said carrier table, a rock shaft connected with said slide, a rock arm loosely pivoted on said rock shaft arranged to be rocked in synchronism with the movements of said carrier table, the hub of said rock arm being formed with a ratchet tooth, a second rock arm secured to said rock shaft and equipped at its outer end with a pivot pin, said pivot pin carrying a short rock arm and also a pawl arranged to cooperate with the ratchet tooth on the hub of said first-mentioned rock shaft, the outer end of said short rock arm being connected to said contact member and arranged to rock said pawl into engagement with said ratchet tooth when said contact member is engaged by the flange of a ring in said carrier table.

28. In combination with means for feeding sheet metal strips, forming and assembling mechanism including an intermittently movable turret formed with a circular row of circular ring seats arranged to stop at successive work stations, the axes of the turret and ring seats being parallel, means adjacent the first work station for bending the strip to form rings outwardly flanged on one edge and also for positioning the rings in the successive ring seats, said rings being supported in said ring seats by their outward flanges, means at subsequent work stations for feeding closure disks into axial alignment with said rings, and means for interlocking the opposite edge of said rings with said disks.

EDWIN V. SWANGREN.